United States Patent
Tsuchiya et al.

[11] Patent Number: 6,111,832
[45] Date of Patent: Aug. 29, 2000

[54] DISK DISCRIMINATION METHOD AND DEVICE

[75] Inventors: Shigeo Tsuchiya; Tatsuro Shimizu, both of Yokohama; Hiroshi Nakane, Fukaya, all of Japan

[73] Assignee: Kabushiki Kaisha Toshiba, Kawasaki, Japan

[21] Appl. No.: 08/961,099

[22] Filed: Oct. 30, 1997

[30] Foreign Application Priority Data

Oct. 31, 1996 [JP] Japan .................................. 8-290504
Sep. 26, 1997 [JP] Japan .................................. 9-261891

[51] Int. Cl.$^7$ ....................................... G11B 7/00
[52] U.S. Cl. ..................... 369/54; 369/44.27; 369/112
[58] Field of Search ........................... 369/44.27, 44.28, 369/44.29, 44.25, 44.34, 44.41, 47, 48, 49, 50, 54, 58, 59, 60, 94, 112

[56] References Cited

U.S. PATENT DOCUMENTS

| 5,136,569 | 8/1992 | Fennema et al. | 369/58 |
| 5,289,451 | 2/1994 | Ashimuma et al. | 369/58 |
| 5,856,965 | 1/1999 | Tsuchiya et al. | 369/58 |
| 5,859,822 | 1/1999 | Inoue et al. | 369/58 |

FOREIGN PATENT DOCUMENTS

| 5-54406 | 3/1993 | Japan . |
| 7-37259 | 2/1995 | Japan . |

OTHER PUBLICATIONS

Patent Abstracts of Japan, vol. 017, No. 366 (P–1571), Jul. 9, 1993 & JP 05 054406 A (Matsushita Electric Ind Co Ltd), Mar. 5, 1993.

Anonymous: "Detection of Optical Disk Type", IBM Technical Disclosure Bulletin, vol. 29, No. 3, Aug. 1986, pp. 995–999, XP002092918 New York, US, *the whole document*.

Patent Abstracts of Japan, vol.097, No. 012, Dec. 25, 1997 & JP 09 219056 A (Hitachi LTD), Aug. 19, 1997.

*Primary Examiner*—Muhammad Edun
*Attorney, Agent, or Firm*—Pillsbury Madison & Sutro, LLP

[57] ABSTRACT

An optical disk has a reflecting layer and a transparent substrate formed on the reflecting layer. The type of the optical disk changes depending on the physical characteristics of the reflecting layer and the thickness of the transparent substrate. When discriminating such a disk, an objective lens which focuses an optical beam on the disk is moved toward the disk. Along with this movement, a detection signal that detects an optical beam reflected by the disk generates a detection signal. First, a peak accompanying mirror surface reflection of the surface of the disk appears, and then a peak accompanying reflection of the reflecting layer appears. The type of the disk which concerns the transparent substrate of the optical disk is discriminated from the time interval between the two peaks. The characteristics and reflection level of the RF component of detection signal generated by the detector change in accordance with the count of reflecting layers and the reflectance of the reflecting layer(s). This discriminates the physical characteristics of the reflecting surface and the type of the optical disk. In this manner, with the disk type discrimination method and device according to the present invention, discrimination can be performed within a substantially constant, short period of time after the disk is set in the device until the disk is recognized.

18 Claims, 17 Drawing Sheets

DISK DISCRIMINATION METHOD AND DEVICE

BACKGROUND OF THE INVENTION

The present invention relates to a method and device for discriminating the type of a disk loaded in an optical disk apparatus and, more particularly, to a method and device for discriminating the type of a disk in which a transparent substrate is formed on a reflecting layer.

In recent years, along with the diversification of the CD-ROM format and the advent of DVDs, various types of optical disks have been introduced and will be developed and introduced in the future. For example, among normal CDs, there are music CDs, and among CD-ROM formats, there are read-only CD-ROMs, writable CDRs, CDR2s that can be read even with different wavelengths, erasable CD-Es, and the like. Among DVDs, there are one-layer disks, two-layer disks, writable DVD-Rs, and writable/readable DVD-Rs. A DVD disk apparatus for these DVDs must be able to play back not only DVDs but also CDs.

Various proposals have been made concerning a disk apparatus that can play back not only DVDs but also CDs, and such a disk apparatus is under development. In the development of such a disk apparatus, it is requested that the type of a loaded disk be discriminated within a short period of time and that the respective portions of the apparatus be set according to the disk type.

According to an example of a disk discrimination method, i.e., a disk recognition method, a disk is played back under an assumption that the playback target is a one-layer DVD. If data cannot be loaded, then this disk is played back under an assumption that it is a CD. According to this method, in a worst case, data read can only be made through four assumption steps, i.e., the disk is not a one-layer DVD, the disk is not a two-layer DVD, the disk is not a normal CD, and the disk is not a normal CD but is a CD having a lower reflectance than that of a normal CD. According to this disk recognition method, in a fortunate case, data read can be made through one step. However, in a worst case, data read can only be made through four steps. On the user side, this means that a time required after the disk is set in the apparatus until the apparatus recognizes the disk, that is, the total time of initializing time and ready time is not always constant but becomes long or short. Accordingly, the user will fear or suspect that the apparatus be broken, leading to a conclusion that the apparatus is not easy to use.

BRIEF SUMMARY OF THE INVENTION

It is an object of the present invention to provide a disk type discrimination method and device in which a time required after a disk is set in an apparatus till the disk is recognized is short and substantially constant.

According to the present invention, there is provided a disk type discrimination device comprising:

focusing means, having an optical axis, for focusing an optical beam on a disk serving as a discrimination target having a reflecting layer and a transparent substrate formed on the reflecting layer;

moving means for moving the focusing means along the optical axis; and discriminating means for discriminating a type of the disk in response to detection of a beam reflected by a surface of the transparent substrate and detection of a beam reflected by the reflecting layer that accompany movement of the focusing means.

According to the present invention, there is also provided a disk type discrimination method comprising the steps of:

focusing an optical beam on a disk serving as a discrimination target having a reflecting layer and a transparent substrate formed on the reflecting layer;

moving a focus point along the optical axis; and discriminating a type of the disk in response to detection of a beam reflected by a surface of the transparent substrate and detection of a beam reflected by the reflecting layer that accompany movement of the focus point.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Figure 1:
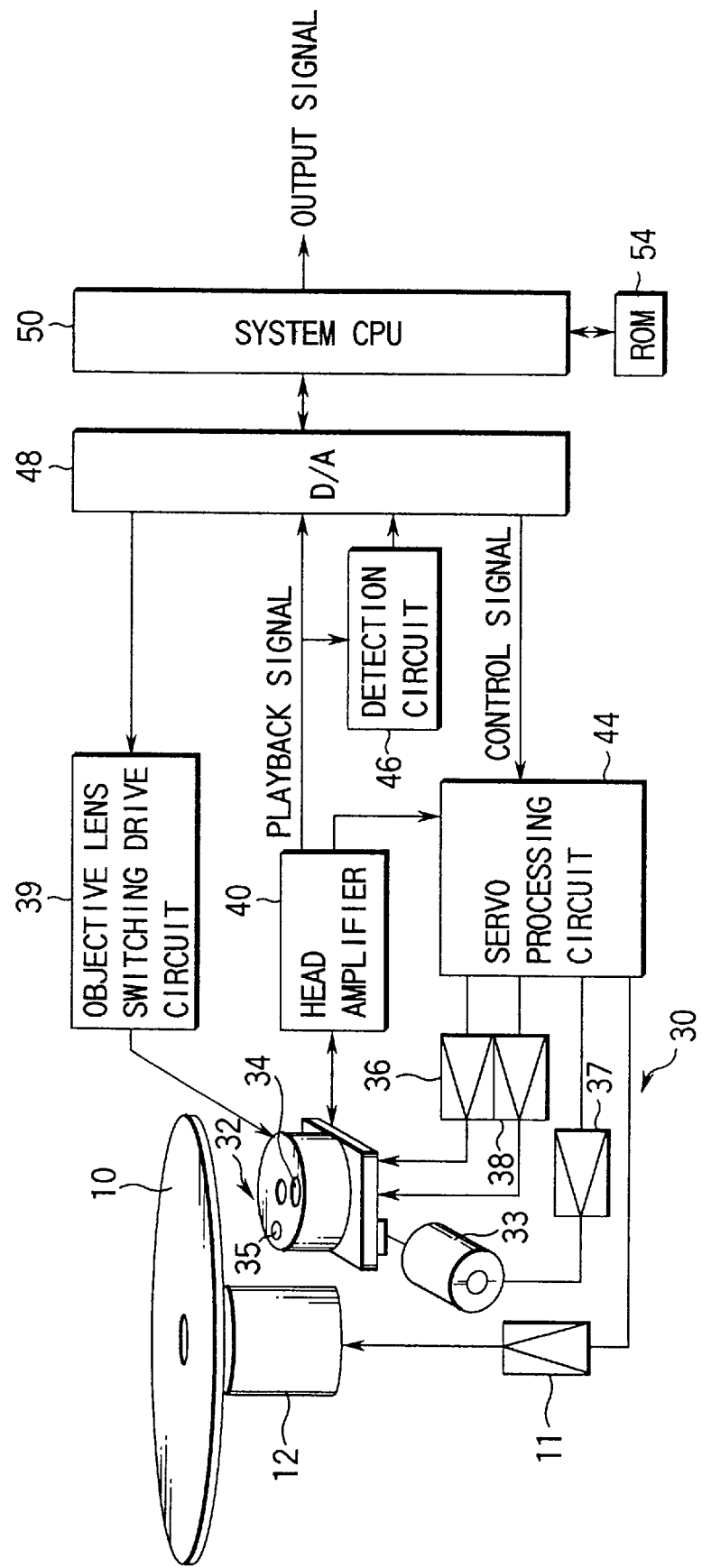
FIG. 1 is a block diagram showing in detail a disk drive unit incorporating a disk type discrimination device according to the present invention.
Figure 2:
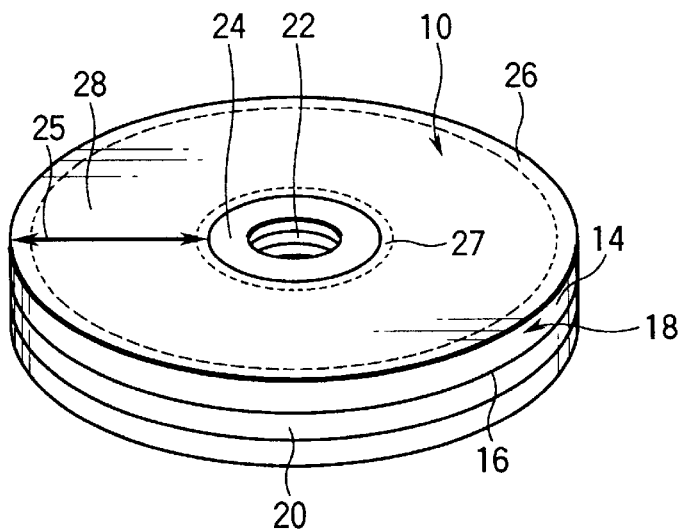
FIG. 2 is a perspective view schematically showing the structure of an optical disk shown in FIG. 1.

A disk discrimination device according to an embodiment of the present invention will be described with reference to the accompanying drawings. FIG. 1 is a block diagram of a disk drive unit that drives an optical disk, and FIG. 2 shows the structure of the optical disk shown in FIG. 1.

As is already known, an optical disk 10 can employ one of various structures. A high-density recording type optical disk in which information is recorded at a high density is available. As shown in FIG. 2, for example, this disk is obtained by preparing a pair of structures 18, each obtained by forming a recording layer, i.e., a light-reflecting layer 16, on a transparent substrate 14, and adhering the pair of structures 18 to each other through an adhesive layer 20 such that their recording layers 16 are sealed in them. In the optical disk 10 having this structure, a central hole 22 in which the spindle of a spindle motor 12 is inserted is formed at its center, and a clamping area 24 for clamping the optical disk 10 during rotation is formed around the central hole 22.

A portion extending from the clamping area 24 to the outer circumferential end of the optical disk 10 is defined as an information recording area 25 of the optical disk 10 where information can be recorded. The optical disk shown in FIG. 2 has information recording areas 25 on its two surfaces. In each information recording area 25, its outer peripheral area is defined as a lead-out area 26 where information is not usually recorded, its inner peripheral area adjacent to the clamping area 24 is usually defined as a lead-in area 27 where information is not usually recorded, and a portion between the lead-out area 26 and lead-in area 27 is defined as a data recording area 28. Usually, a spiral track is continuously formed as a data recording area on the recording layer 16 in the information recording area 25, and this continuous track is divided into a plurality of sectors. Data is recorded with reference to these sectors. The data recording area 28 of the information recording area 25 is an actual data recording area where management data, main picture data, sub-picture data, and audio data are recorded in the same manner in the form of physical state changes of pits or the like. In the read-only optical disk 10, a pit array is formed in each transparent substrate 14 in advance with a stamper. A reflecting layer is formed by vapor deposition on the surface of the transparent substrate 14 where the pit array is formed, and this reflecting layer is formed as the recording layer 16. In this read-only optical disk 10, usually, a groove serving as a track is not particularly formed, but the pit array is defined as the track.

Usually, in this high-density recording optical disk 10 (to be merely referred to as a DVD disk hereinafter), each transparent substrate 14 has a thickness of 0.6 mm, which is half that (1.2 mm) of the transparent substrate of a conventional CD or an optical disk, e.g., a CD-ROM. The track pitch of the CD is equal to or larger than twice that of the DVD disk 10, which is a high-density recording disk. Among CDs, in addition to a normal CD, there is a CD-E on which data can be recorded and from which the recorded data can be erased. The reflectance of the CD-E is lower than that of a normal CD. The DVD has two types, i.e., a type having one recording layer 16 and a type having two recording layers 16.

In this manner, various types of disks are available. In the present invention, these types are discriminated in accordance with the following method. In discrimination between a CD and a DVD, a difference in thickness of the transparent substrate 14 is referred to. More specifically, a certain objective lens, preferably a DVD objective lens, is moved along its optical axis and searches the disk with its focus point. Whether the disk is of the CD or DVD type is discriminated with reference to a time required after the focus point reaches the transparent substrate 14 until reaching the reflecting layer 16. In the case of a DVD, whether this DVD has one or two reflecting layers 16 is discriminated based on whether reflection by the reflecting layer(s) takes place once or twice in the same search process. Whether this disk is a normal CD or an erasable CD-E is discriminated by comparing the strength of the optical beam reflected by the reflecting layer 16 with a reference value. If the disk is a CD-E, since its reflectance is low, a reflecting strength lower than the reference value is detected. If the disk is a normal CD, a reflecting strength higher than the reference value is detected. This discrimination method will be described in more detail with reference to FIGS. 14 to 17E.

In the optical disk playback apparatus for playing back data from such an optical disk 10, the type of the optical disk 10 is discriminated by a disk drive unit 30 on which the optical disk 10 is loaded to be driven. Thereafter, this optical disk 10 is searched with an optical beam. More specifically, in the disk discrimination method which will be described later with reference to FIGS. 14 to 17E the optical disk 10, as shown in FIG. 1, is placed on a spindle motor 12 driven by a motor drive circuit 11, and its type is discriminated. In this discrimination method, this motor drive circuit 11 is not actuated. The optical disk 10 is maintained in a stopped state or substantially stopped state, and its type is discriminated in this stopped state. After the type of the optical disk 10 is discriminated, rotation of the optical disk 10 is started by the spindle motor 12 immediately, and the optical disk 10 is searched with an optical beam emerging from objective lens 34 or 35 which is focus- or tracking-controlled.

As shown in FIG. 1, an optical head, i.e., an optical pickup 32, which focuses an optical beam, i.e., a laser beam, on the optical disk 10 is arranged under the optical disk 10. This optical pickup 32 will be described later in detail, and has the objective lens 35 for a CD or CD-ROM which has a small numerical aperture and the objective lens 34 for a DVD optical disk which has a large numerical aperture as described above with reference to FIG. 2. An objective lens switching drive circuit 39 is also arranged to generate a drive signal that performs a switching operation between the objective lenses 34 and 35. When the type of the optical disk 10 to be searched is specified, i.e., whether the optical disk 10 is of the conventional CD type or DVD type is specified, the objective lens switching drive circuit 39 is actuated, and one of the objective lenses 34 and 35 is selected by a drive signal sent from the objective lens switching drive circuit 39 in accordance with the optical disk 10, the type of which is specified, and the selected lens is arranged in the laser beam optical path.

This optical head 32 is placed on a guide mechanism to be movable in the radial direction of the optical disk 10 in order to search for the information recording area 25, in particular the data recording area 28, and is moved in the radial direction of the optical disk 10 by a feed motor 33 driven by a drive signal sent from a drive circuit 37. As will be described later in detail, in the optical disk apparatus, the objective lenses 34 and 35 are held to be movable along their optical axes, and are moved along their optical axes in response to a drive signal sent from a focus drive circuit 36. The objective lenses 34 and 35 are always maintained in the in-focus state to form small beam spots on the recording layer 16. The objective lenses 34 and 35 are held to be slightly movable in the radial direction of the optical disk 10, as will be described later in detail, and are slightly moved in response to a drive signal sent from a track drive circuit 38. The objective lenses 34 and 35 are always maintained in the tracking state to follow a track on the recording layer 16 of the optical disk 10 with the optical beams.

Figure 3:
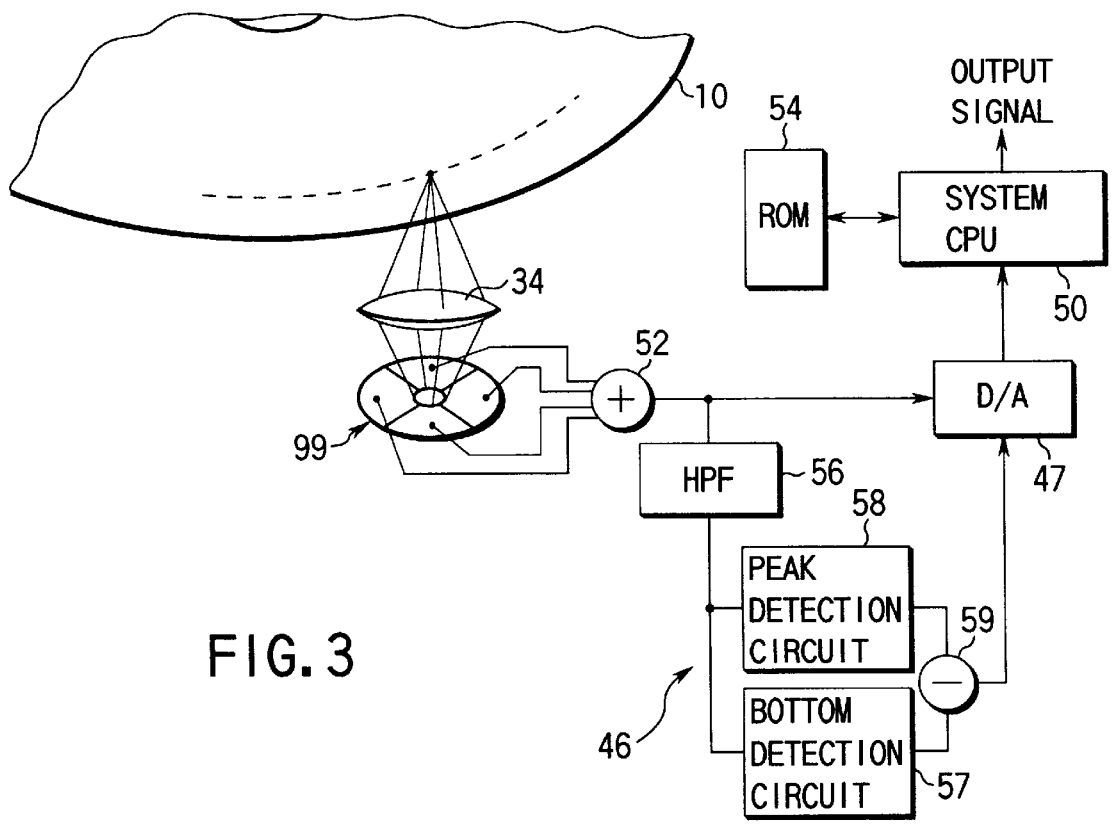
FIG. 3 is a block diagram showing an example of the disk type discrimination device shown in FIG. 1.
Figure 4:
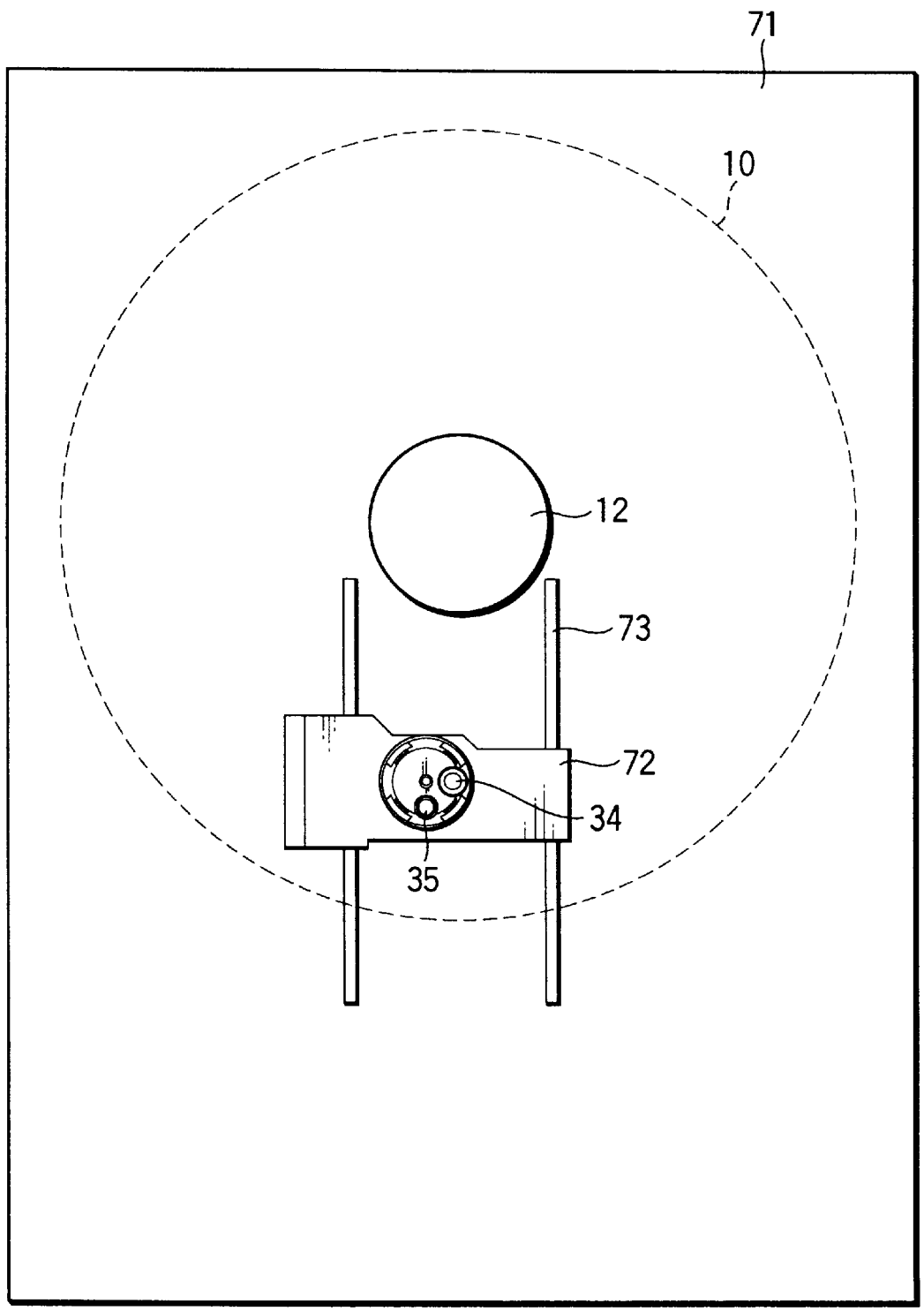
FIG. 4 is a plan view schematically showing an objective lens drive unit that switches and drives objective lenses shown in FIG. 1.

In the optical head 32, the optical beam reflected by the optical disk 10 is detected. A detection signal of the detected optical beam is supplied from the optical head 32 to a servo processing circuit 44 through a head amplifier 40. The servo processing circuit 44 generates a focus signal, a tracking signal, and a motor control signal from the detection signal, and supplies these signals to the drive circuits 36, 38, and 11. Therefore, the objective lenses 34 and 35 are maintained in the focus state or tracking state, the spindle motor 12 is rotated at a predetermined rotation speed, and the track on the recording layer 16 is followed with the optical beam at, e.g., a constant linear speed. When a control signal serving as an access signal is supplied from a system CPU 50 to the servo processing circuit 44 through a D/A converter 47, the servo processing circuit 44 supplies a movement signal to the drive circuit 37. The optical head 32 is moved in the radial direction of the optical disk 10 to access a predetermined sector of the recording layer 16. A playback signal is amplified by the head amplifier 40 and output from the disk drive unit 30. The output playback signal is supplied to the system CPU 50 through the D/A converter 47, and is also supplied to the system CPU 50 through a detection circuit 46 for detection and the D/A converter 47. More specifically, as shown in FIG. 3, the optical beam emerging from the objective lens 34 is guided to a detector 99 having four detection areas, and is detected as a detection signal by each detection area. Obtained detection signals are added by an adder 52 in the head amplifier 40, and a sum signal SBAD is supplied to the system CPU 50 through the D/A converter 47. The detection circuit 46 is constituted by a by-pass filter 56, a peak detection circuit 58, a bottom detection circuit 57, and a subtraction circuit 59. The sum signal SBAD is subjected to RF detection performed by the by-pass filter 56, and the RF-detected component is input to both the peak detection circuit 58 and bottom detection circuit 57. Accordingly, the bottom of the RF component is detected by the bottom detection circuit 57, and a bottom detection signal corresponding to the DC component is output from the bottom detection circuit 57. A peak of the RF component is detected by the peak detection circuit 58, and a peak detection signal corresponding to the AC component is output from the peak detection circuit 58. In the subtraction circuit 59, the bottom detection signal is subtracted from the peak detection signal. A peak detection signal RFRP not including a DC component is output from the subtraction circuit 59 to the system CPU 50 through the D/A converter 47.

The optical pickup 32 and its guide mechanism shown in FIG. 1 will be described in detail with reference to FIGS. 4 to 11B.

The spindle motor 12, which has been described above, is fixed on a base 71, as shown in FIG. 4, and the optical disk 10 rotated by the spindle motor 12 is held by a chucking means (not shown). Below the optical disk 10, a pair of guide rails 73, which are arranged parallel to each other in the radial direction of the optical disk 10, are fixed on the base 71. A carriage 72 which runs on the guide rails 73 is placed on the guide rails 73, and an objective lens actuator shown in FIG. 5 is arranged on the carriage 72.

Figure 5:
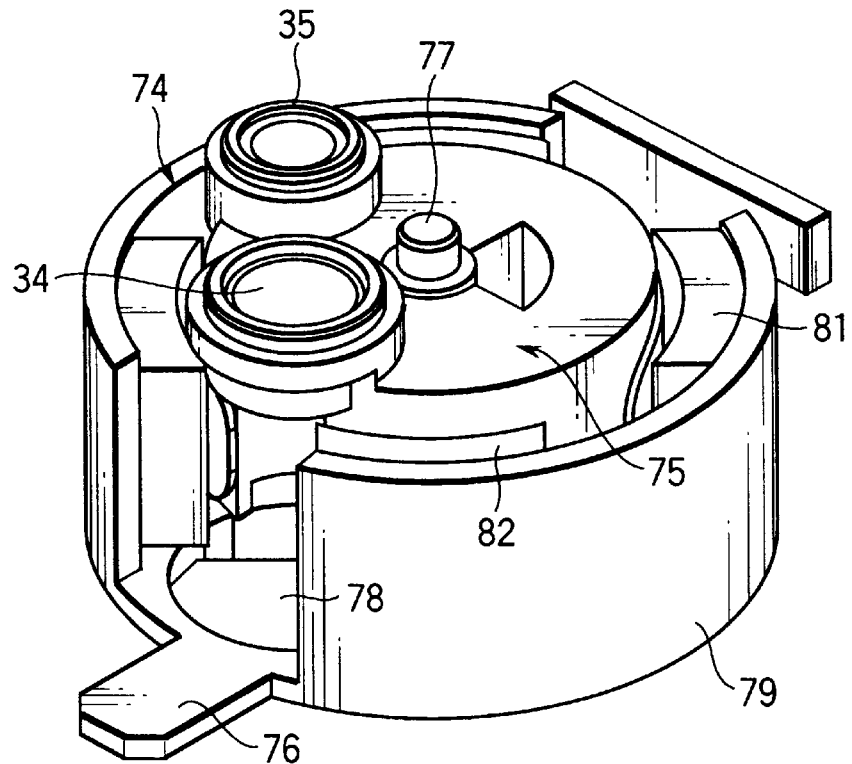
FIG. 5 is a perspective view showing the optical pickup of the objective lens drive unit shown in FIG. 4.
Figure 6:
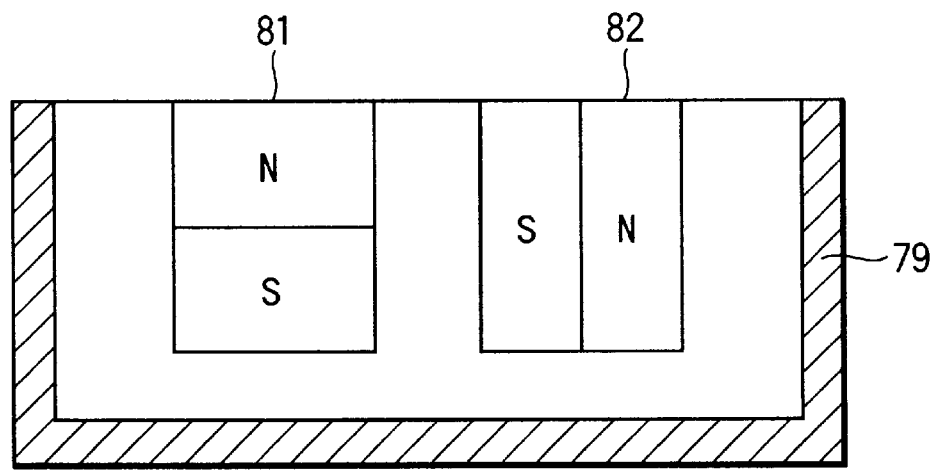
FIG. 6 is a sectional view showing the internal structure of the lens drive unit of the optical pickup shown in FIG. 5.

The lens actuator shown in FIG. 5 is constituted by a floatable and rotatable lens holder 75, and a lens holder support 74 in which the lens holder 75 is accommodated. The lens holder support 74 is formed with an actuator base 76 fixed on the carriage 72 and having an opening portion 78 for the laser beam optical path. A shaft 77 is fixed at the central portion of the actuator base 76. The lens holder support 74 is also formed with an arcuated yoke 79 extending along the circumference of the shaft 77 and fixed on the actuator base 76. Two sets of arcuated permanent magnets 81 and 82 are arranged in the arcuated yoke 79 to be symmetric about the shaft 77. In the two sets of permanent magnets 81 and 82, each set of the permanent magnets opposing each other are magnetized in the same magnetization direction. One set of permanent magnets 81 are magnetized such that their N and S poles are arranged in the direction along the shaft 77, as shown in FIG. 6. The other set of permanent magnets 82 are magnetized along the arc of the arcuated yoke 79, as shown in FIG. 5.

Figure 7:
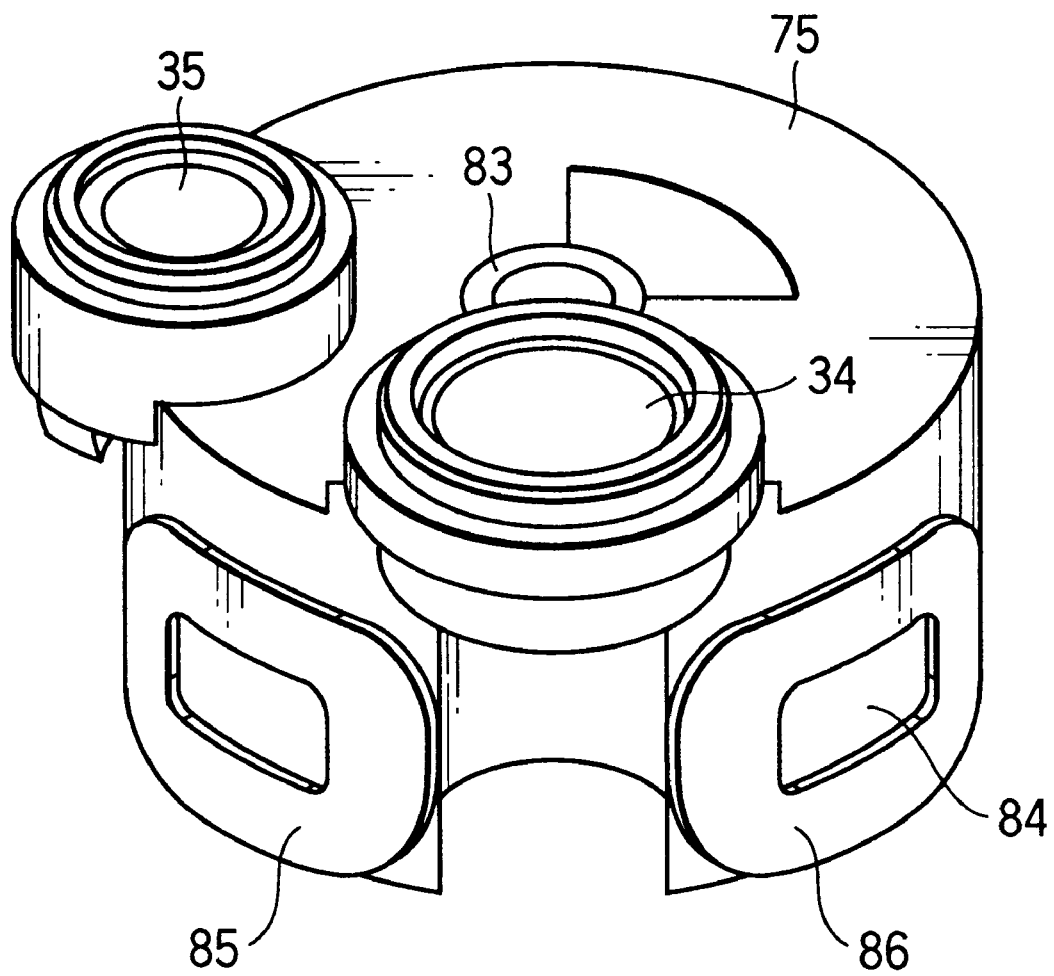
FIG. 7 is a perspective view showing the lens holder of the optical pickup shown in FIG. 5.

The lens holder 75 is formed substantially cylindrical, as shown in FIG. 7. The objective lens 35 of the type for the CD or the like, and the objective lens 34 for the high-density recording type disk, i.e., for the DVD are arranged on the upper surface of the lens holder 75. A hollow portion is formed under each of the objective lenses 34 and 35 to allow a laser beam to pass there. The objective lenses 34 and 35 are fixed in the lens holder 75 such that their optical axes are arranged on the same circumference around the center of the lens holder 75. A bearing 83 through which the shaft 77 extends is fixed at the center of the lens holder 75. The lens holder 75 is supported by the shaft 77 through the bearing 83 to be rotatable and vertically movable. Magnetic members 84 are buried in the circumferential surface of the lens holder 75 to be symmetric about the shaft 77. Four magnetic coils 85 and 86 that are arranged similarly symmetric about the shaft 77 are fixed on the magnetic members 84.

Figure 8:
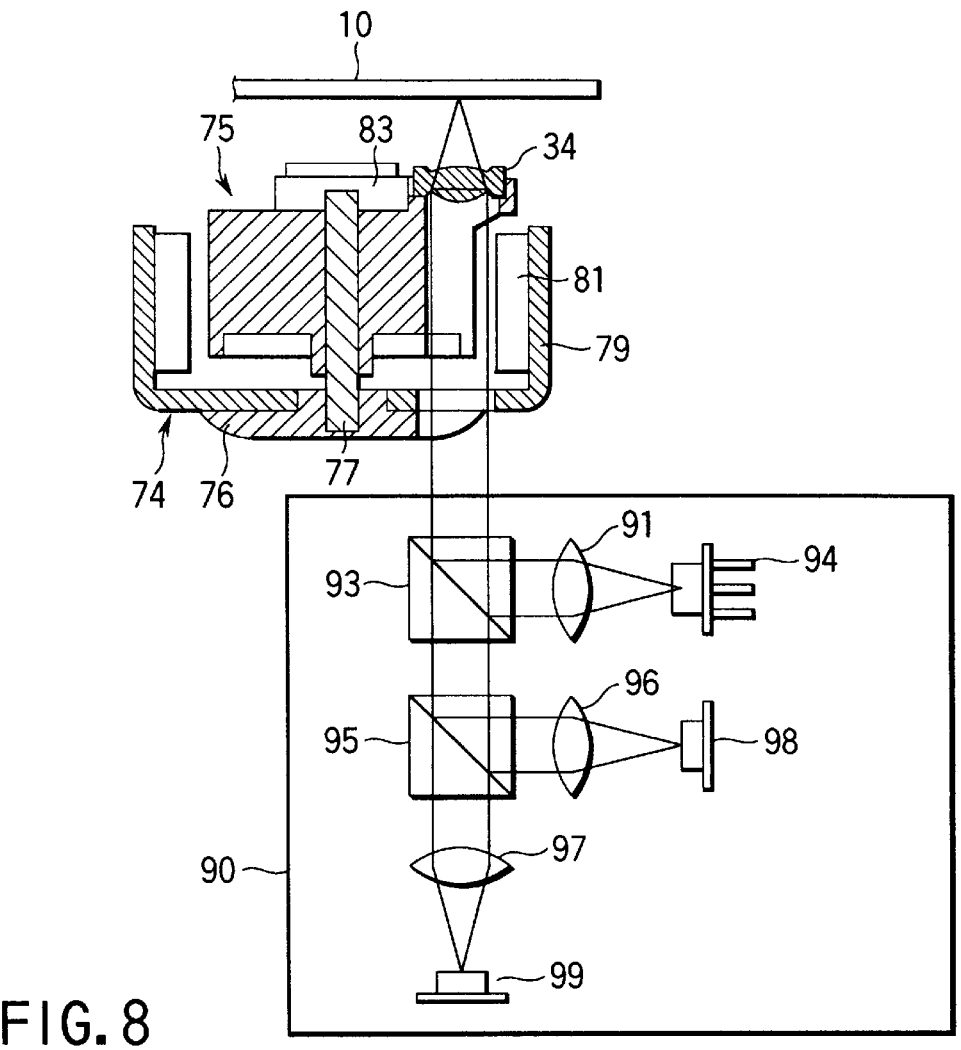
FIG. 8 is a schematic view showing the optical pickup shown in FIG. 5 and an optical system concerning it.

FIG. 8 shows the optical pickup 32 and an optical unit 90 of an optical system related to the optical pickup 32. The optical unit 90, including a semiconductor laser 94 and the like for generating a laser beam to be focused on the optical disk 10, is housed and fixed in the internal space of the carriage 72 which is a movable member. The laser beam generated by the semiconductor laser 94 of the optical unit 90 is collimated by a collimator lens 91 in the optical unit 90, is reflected by a beam splitter 93, and is guided outside the optical unit 90. The laser beam emerging from the optical unit 90 is guided to either the objective lens 34 or 35 of the optical pickup 32 fixed on the carriage 72. The laser beam is focused on the recording track of the optical disk 10 by the objective lens 34 or 35. The laser beam reflected by the optical disk 10 is returned to the optical unit 90 through one of the objective lenses 34 and 35. In the optical unit 90, the laser beam passes through the beam splitter 93 and is divided into two beams by a beam splitter 95. The two divisional laser beams are respectively condensed by condenser lenses 96 and 97, and are respectively detected by first and second photo-detectors 98 and 99 arranged in the optical unit 90. Detection signals from the photodetectors 98 and 99 generate an information signal, a focus error signal, a track error signal, and the like. A position error in the focus direction of selected one of the objective lenses 34 and 35 is detected by using the focus error signal, and a current is supplied to one set of coils 85 and 86, in a manner to be described later, to correct this position error. A position error in the track direction of selected one of the objective lens 34 or 35 is detected by using the track error signal, and a current is supplied to the other set of coils 85 and 86 to correct this position error. Information is recorded on and read from the recording track of the optical disk 10 in this manner.

The operation of the optical pickup 32 described above will be described in detail.

Figure 9:
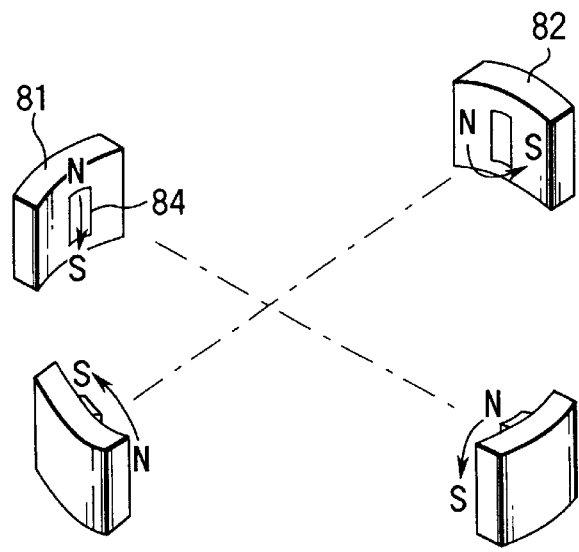
FIG. 9 is a conceptual view for explaining the principle which causes the lens holder to float magnetically in the optical pickup shown in FIG. 5.
Figure 10A:
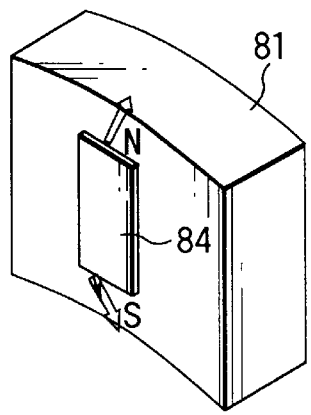
FIGS. 10A to 10F are perspective views showing the principle of a magnetic spring which causes the lens holder to float magnetically with the arrangement shown in FIG. 9.
Figure 10B:
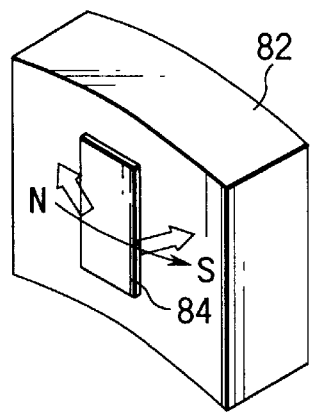
Figure 10C:
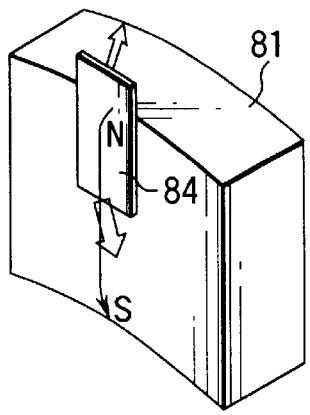
Figure 10D:
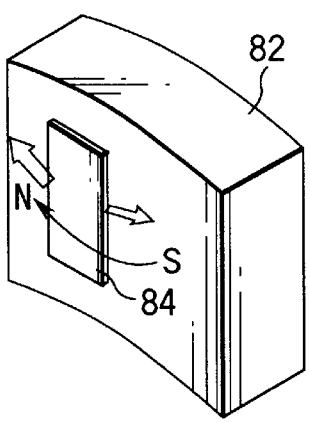
Figure 10E:
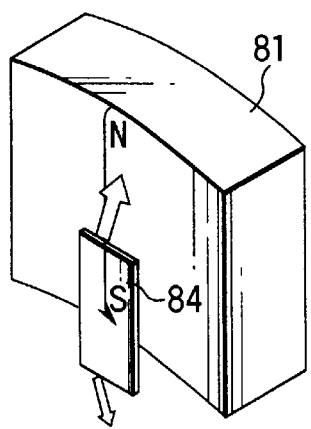
Figure 10F:
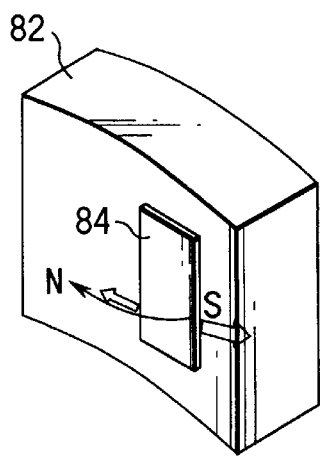

First, the reason why the lens holder 75 magnetically floats in the lens holder support 74 by a so-called magnetic spring will be described. As has been described above, in the lens holder support 74, the two sets of permanent magnets 81 and 82 are arranged symmetric about the shaft 77 of the lens holder support 74, as shown in FIG. 9, and the magnetic members 84 oppose corresponding ones of the permanent magnets 81 and 82 through a gap. More specifically, the magnetic members 84 are arranged symmetric about the shaft 77, and are fixed on the lens holder 75. Accordingly, the magnetic members 84 are attracted by the permanent magnets 81 and 82, and the permanent magnets 81 and 82, and the magnetic members 84 are maintained at neutral positions in a certain stable state, as shown in FIGS. 10A and 10B. As a result, the lens holder 75 magnetically floats in the lens holder support 74. If a disturbance acts on the lens holder 75 and the magnetic members 84 are dislocated upward from the neutral positions, as shown in FIG. 10C, a downward force that returns the magnetic members 84 to the neutral positions acts on the magnetic members 84 more strongly than an upward force does, and the magnetic members 84 are returned to the neutral positions accordingly. Similarly, if a disturbance acts on the lens holder 75 and the magnetic members 84 are dislocated downward from the neutral positions, as shown in FIG. 10E, an upward force that returns the magnetic members 84 to the neutral position acts on the magnetic members 84 more strongly than a downward force does, and the magnetic members 84 are returned to the neutral positions accordingly. If a disturbance acts on the lens holder 75 and the magnetic members 84 are deviated to the right in the circumferential direction from the neutral positions, as shown in FIG. 10D, a leftward force that returns the magnetic members 84 to the neutral positions acts on the magnetic members 84 more strongly than a rightward force does, and the magnetic members 84 are returned to the neutral positions accordingly. Similarly, if a disturbance acts on the lens holder 75 and the magnetic members 84 are deviated to the left in the circumferential direction from the neutral positions, as shown in FIG. 10F, a rightward force that returns the magnetic members 84 to the neutral positions acts on the magnetic members 84 more strongly than a leftward force does, and the magnetic members 84 are returned to the neutral positions accordingly.

Since the magnetic members 84 are mounted at axisymmetric positions, when the objective lenses are switched by rotating the lens holder 75, in a manner to be described below, the position of the original first objective lens 34 set at the neutral position, which is determined by magnetic attraction, coincides with the neutral position of the new second objective lens 35. Therefore, the second objective lens 35 can be used as it is adjusted by the optical unit 90 and the first objective lens 34.

Figure 11A:
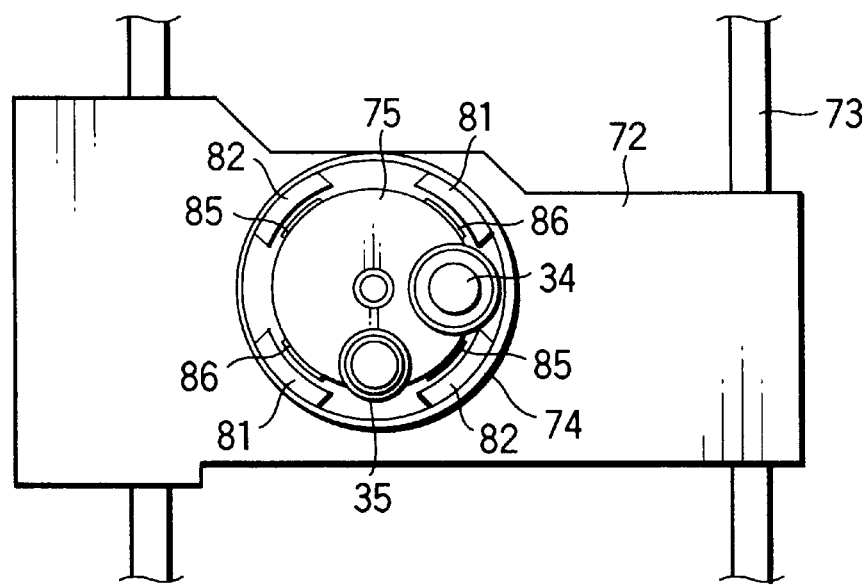
FIGS. 11A and 11B are plan views showing the objective lens switching operation of the objective lens drive unit.
Figure 11B:
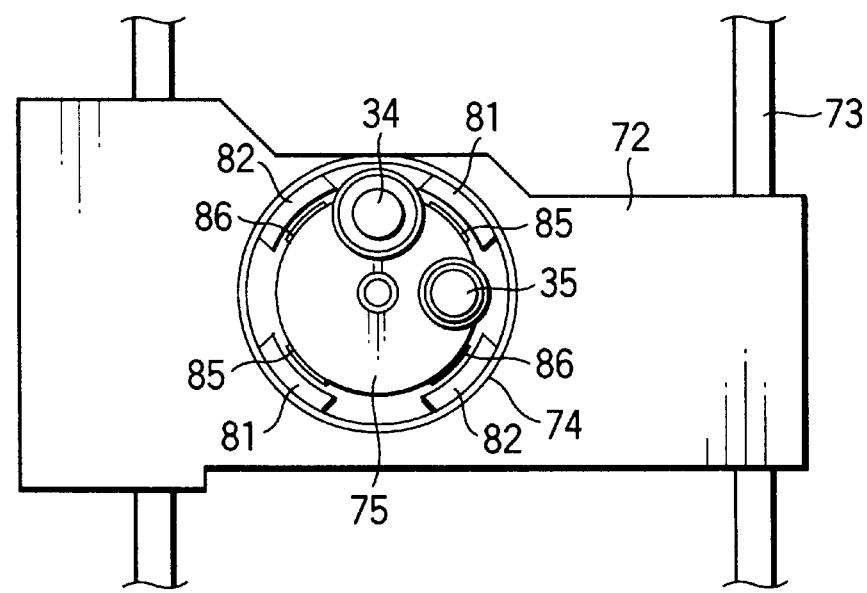
Figure 12:
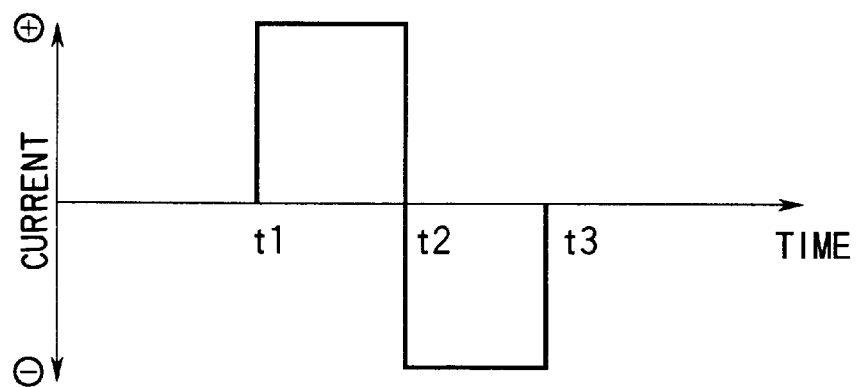
FIG. 12 is a waveform chart showing a signal that causes the magnetic circuit shown in FIGS. 11A and 11B to perform the objective lens switching operation.

The switching operation for the objective lenses 34 and 35 to select the objective lens 34 or 35 will be described. As shown in FIGS. 8 and 11A, when the objective lens 34 having a large numerical aperture is arranged in the optical path of the laser beam, assume that the coils 85 oppose the permanent magnets 82 magnetized in the circumferential direction and that the coils 86 oppose the permanent magnets 81 magnetized in the axial direction. This state corresponds to the neutral state described above, and the lens holder 75 is stably maintained at the original position. In this stable state, when a positive current is supplied to the coils 85 at time t1, as shown in FIG. 12, as indicated by an arrow $P_0$ in FIG. 13, a current that interacts with a magnetic field generated by the permanent magnets 82 is supplied to axial portions 85A and 85B, that are parallel to the shaft 77, of the coils 85. A force FR that causes a circumferential rotation force is generated in the coils 85, and the lens holder 75 starts rotation. Between time t1 and time t2, a start force that sufficiently rotates the lens holder 75 is supplied to the coils 85. The coils 85 start rotation, and the current supplied to the coils 85 is inverted, as shown in FIG. 12, at time t2 when the trailing-side coil portions 85B of the coils 85 oppose the S poles of the permanent magnets 82. By this inversion, a rotation force FR that drives the coils 85 away from the permanent magnets 82 is generated between the trailing-side coil portions 85B of the coils 85 and the S poles of the permanent magnets 82, and is supplied to the coils 85. As a result, the coils 85 are rotated toward the front surfaces of the permanent magnets 81. At time t3 during rotation, current supply to the coils 85 is stopped. From time t3, the lens holder 75 is rotated by the inertia, and the coils 85 temporarily pass through the neutral points of the permanent magnets 81, but the coils 85 and 86 are returned to the stable neutral positions by the principle that has been described above with reference to FIGS. 10A to 10F. In this manner, because of rotation of the lens holder 75, as shown in FIG. 11B, the coils 86 oppose the permanent magnets 82, the coils 85 oppose the permanent magnets 81, and the objective lens 35 having a small numerical aperture is arranged in the optical path of the laser beam to replace the objective lens 34 having a large numerical aperture, thereby substantially switching the objective lenses.

When the lens holder 75 is rotated to perform a switching operation between the objective lenses 34 and 35, if the clearance between the shaft 77 and the rotary bearing 83 is set to equal to or smaller than 10 microns, the mounting position error between the first and second objective lenses 34 and 35 can be neglected.

The focus operation and tracking operation of the optical pickup 32 shown in FIG. 5 will be described.

Figure 13:
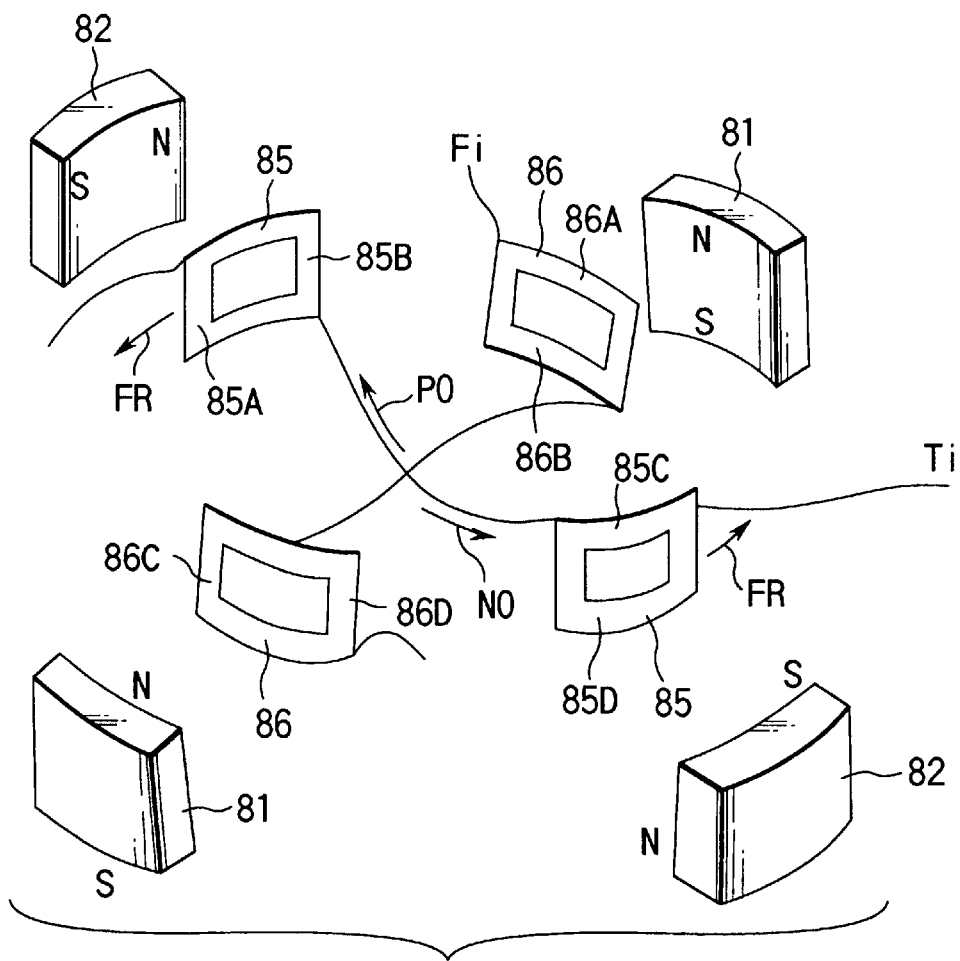
FIG. 13 is a perspective view showing a magnetic circuit that performs a switching operation of the objective lenses in the optical pickup shown in FIG. 5.

As shown in FIGS. 8 and 11A, when the objective lens 34 having a large numerical aperture is arranged in the optical path of the laser beam, the coils 86 opposing the permanent magnets 81 magnetized in the axial direction to perform focus control serve as the focus control coils, and the coils 85 opposing the permanent magnets 82 magnetized in the circumferential direction to perform tracking control serve as the tracking control coils. More specifically, as shown in FIG. 13, when a focus coil drive current Fi is supplied to the coils 86 in response to a focus error signal, it interacts with a magnetic field generated by circumferential portions 86A and 86B of the coils 86 and permanent magnets 81. An upward or downward force acts on the coils 86 in accordance with the direction of the current Fi to vertically move the lens holder 75 in the axial direction, so that the objective lens 34 is maintained in the in-focus state. When a tracking coil drive current Ti is supplied to the coils 85 in response to a tracking error signal, it interacts with a magnetic field generated by the axial portions 85A and 85B of the coils 85 and permanent magnets 82. A rightward or leftward force acts on the coils 85 in accordance with the direction of the current Ti to pivot the lens holder 75 in the circumferential direction, so that the objective lens 34 is maintained in the on-track state.

As has been described above, once the objective lens 35 is selected, the objective lens 35 having a small numerical aperture is arranged in the optical path of the laser beam, as shown in FIG. 11B. In this state, the coils 85 opposing the permanent magnets 81 magnetized in the axial direction to perform focus control serve as the focus control coils, and the coils 86 opposing the permanent magnets 82 magnetized in the circumferential direction to perform tracking control serve as the tracking control coils. More specifically, when the focus coil drive current Fi is supplied to the coils 85 in response to a focus error signal, it interacts with a magnetic field generated by the circumferential portions 85A and 85B of the coils 85 and permanent magnets 81. An upward or downward force acts on the coils 85 in accordance with the direction of the current Fi to vertically move the lens holder 75 in the axial direction, so that the objective lens 34 is maintained in the in-focus state. When the tracking coil drive current Ti is supplied to the coils 86 in response to a tracking error signal, it interacts with a magnetic field generated by axial portions 86C and 86D of the coils 86 and permanent magnets 82. A rightward or leftward force acts on the coils 86 in accordance with the direction of the current Ti to pivot the lens holder 75 in the circumferential direction, so that the objective lens 34 is maintained in the on-track state.

As described above, in the objective lens drive unit according to the present invention, the objective lenses 34 and 35 are switched without applying an external force but by the coils that perform a tracking operation. No excessive force is applied to incline the optical axis, and a stable signal can be played back. Since the coils 85 and 86 switch their functions from tracking to focusing and from focusing to tracking, respectively, or vice versa when the objective lenses 35 and 36 are switched, the coil utilization efficiency is improved, and the drive sensitivity is improved.

The same coils drive either the objective lens 34 or 35, and these coils serve as tracking or focusing coils. Which objective lens is used can be confirmed by supplying a current to either the coils 85 or 86 and detecting the moving directions of the objective lenses 34 and 35, without providing an additional detection unit. Also, whether the optical disk 10 that the objective lens opposes is of the DVD type or general CD (Compact Disk) type can be confirmed.

Figure 14:
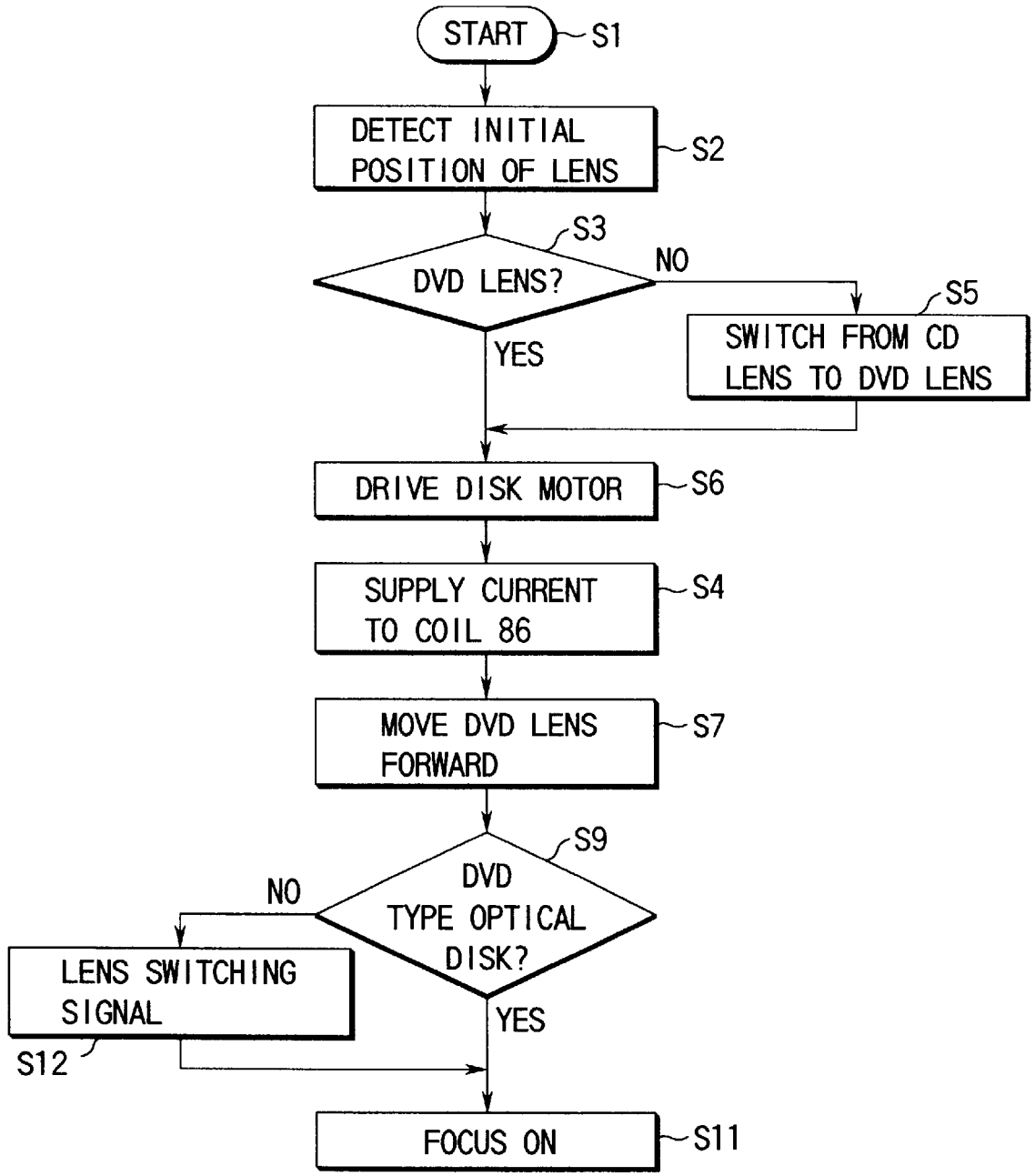
FIG. 14 is a flow chart showing an operation of discriminating the type of an objective lens in the objective.lens drive unit shown in FIG. 5 and discriminating the type of the optical disk.

An operation of initializing the objective lens drive unit, arranging predetermined objective lenses on the optical path, and thereafter selecting an objective lens that matches the type of the optical disk will be referred to with reference to the flow chart of FIG. 14.

In the following description of the operation, since the objective lens 34 having a large numerical aperture is a lens for the DVD type optical disk 10, it will sometimes be referred to merely as a DVD lens 34, and since the objective lens 35 having a small numerical aperture is a lens for a general CD (Compact Disk), it will sometimes be referred to merely as a CD lens 35. In the following description, note that the DVD objective lens 34 is always selected as the major lens in initialization at the operation start of the disk apparatus regardless of the type of the optical disk 10, and thereafter either the lens 34 or 35 is selected in accordance with the type of the optical disk.

The power supply of the optical disk apparatus is turned on. Alternatively, the optical disk is mounted on the optical disk apparatus. Thereafter, the flow of FIG. 14 is started from step S1.

Following step S1 where the discriminating operation of the optical disk 10 is started, detection of the initial position of the lens shown in step S2 is performed. In detection of the initial position of the lens, the switching signal shown in FIG. 12 is supplied to the coils 86 to check whether the selected lens is the DVD lens 34 or the CD lens 35, as indicated in step S3. In detection of initial position, if the coils 86 oppose the focus control permanent magnets 81 and the DVD lens 34 is arranged in the optical path of the laser beam, even when the switching signal as shown in FIG. 12 is supplied to the coils 86, merely the lens holder 75 is vertically moved, and the following step S4 is performed. In contrast to this, if the coils 86 oppose the tracking control permanent magnets 82 and the CD lens 35 is arranged in the optical path of the laser beam, when the switching signal as shown in FIG. 12 is supplied to the coils 86, the lens holder 75 is rotated as described above, as indicated in step S5, and the DVD lens 34 is arranged in the optical path of the laser beam. In other words, the operation indicated in step S2 of detecting the lens initial position corresponds to the operation of arranging the DVD lens 34 in the optical path of the laser beam during initialization.

Once the DVD lens 34 is arranged in the optical path of the laser beam, the optical disk 10 is rotated in a step S6. Thereafter, a current that moves the DVD lens 34 forward from the home position toward the optical disk 10 is supplied to the coils 86, as described in step S4, and the lens holder 75, i.e., the DVD lens 34, is moved forward from the home position, as described in step S7. In response to this forward movement, the adder 52 of FIG. 3 generates a sum signal SBAD. Based on this sum signal SBAD, whether the optical disk 10 is of the high-density recording (DVD) type or general recording-density CD type is checked in step S9, as will be described later. If it is confirmed in step S9 that the optical disk 10 is of the high-density recording (DVD) type, it is determined that the DVD lens corresponding to this DVD type is located on the optical path of the laser beam, and the focus operation is started as described in step S11. In contrast to this, if it is confirmed in step S9 that the optical disk 10 is of the CD type, the switching signal is supplied to the coils 86, as described in step S12, a switching operation is performed from the DVD lens 34 to the CD lens 35, and the CD lens 35 is arranged on the optical path of the laser beam to replace the DVD lens 34. Thereafter, the focus operation of the CD lens 35 corresponding to the CD type optical disk 10 is started, as described in step S11. Prior to step S11 where the focus operation is started, the spindle motor drive circuit 11 is energized to start driving the spindle motor 12, thereby starting rotation of the optical disk 10, as described above. The focus operation described in step S11 is performed while the optical disk 10 rotates.

The flow described above is made on the supposition that the DVD lens 34 is basically arranged in the optical path of the laser beam during initialization. However, another flow is apparently possible in which the CD lens 35 is basically arranged in the optical path of the laser beam.

Figure 15:
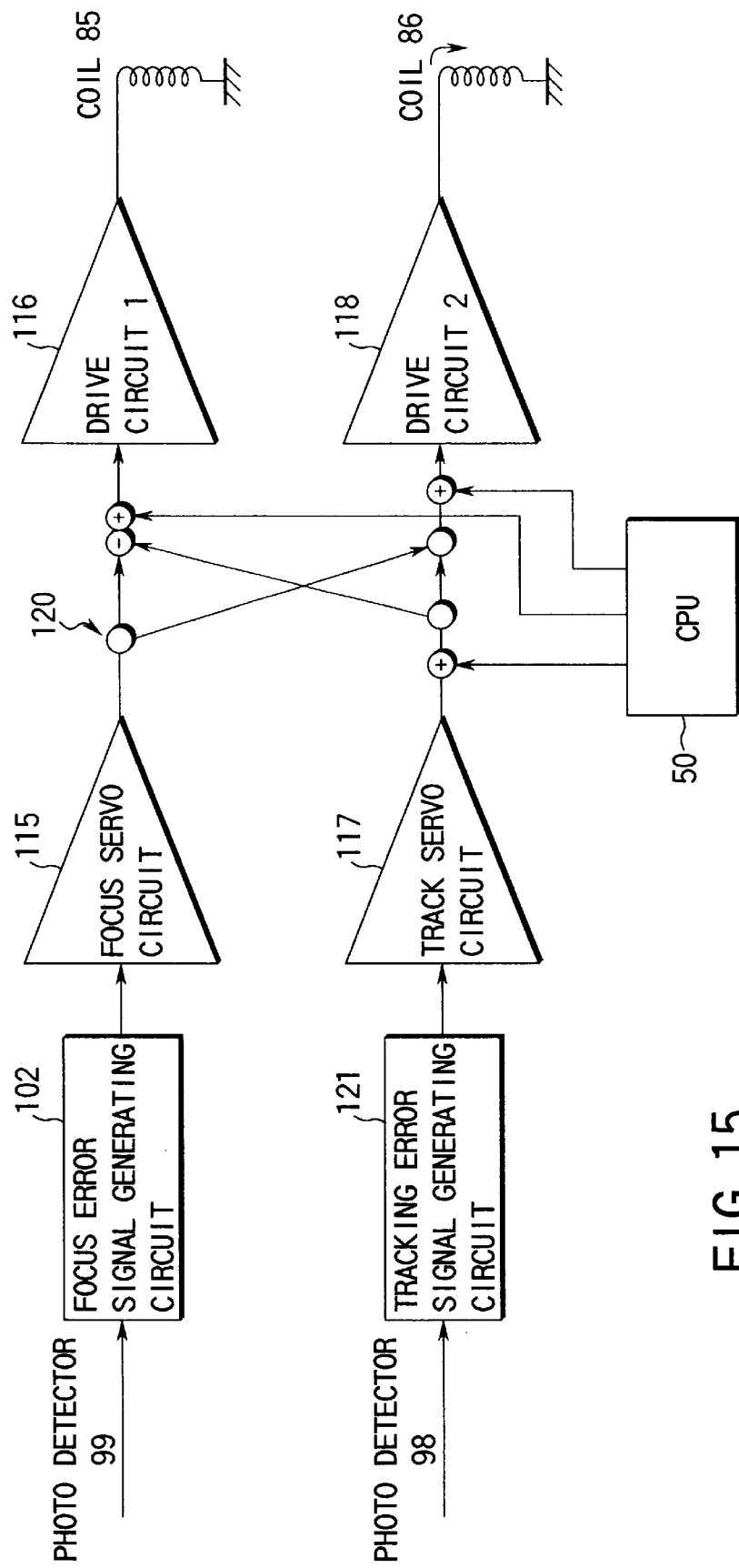
FIG. 15 is a block diagram showing a circuit for discriminating the type of an objective lens in the objective lens drive unit shown in FIG. 5 and discriminating the type of the optical disk loaded in the optical disk apparatus shown in FIG. 1.
Figure 16:
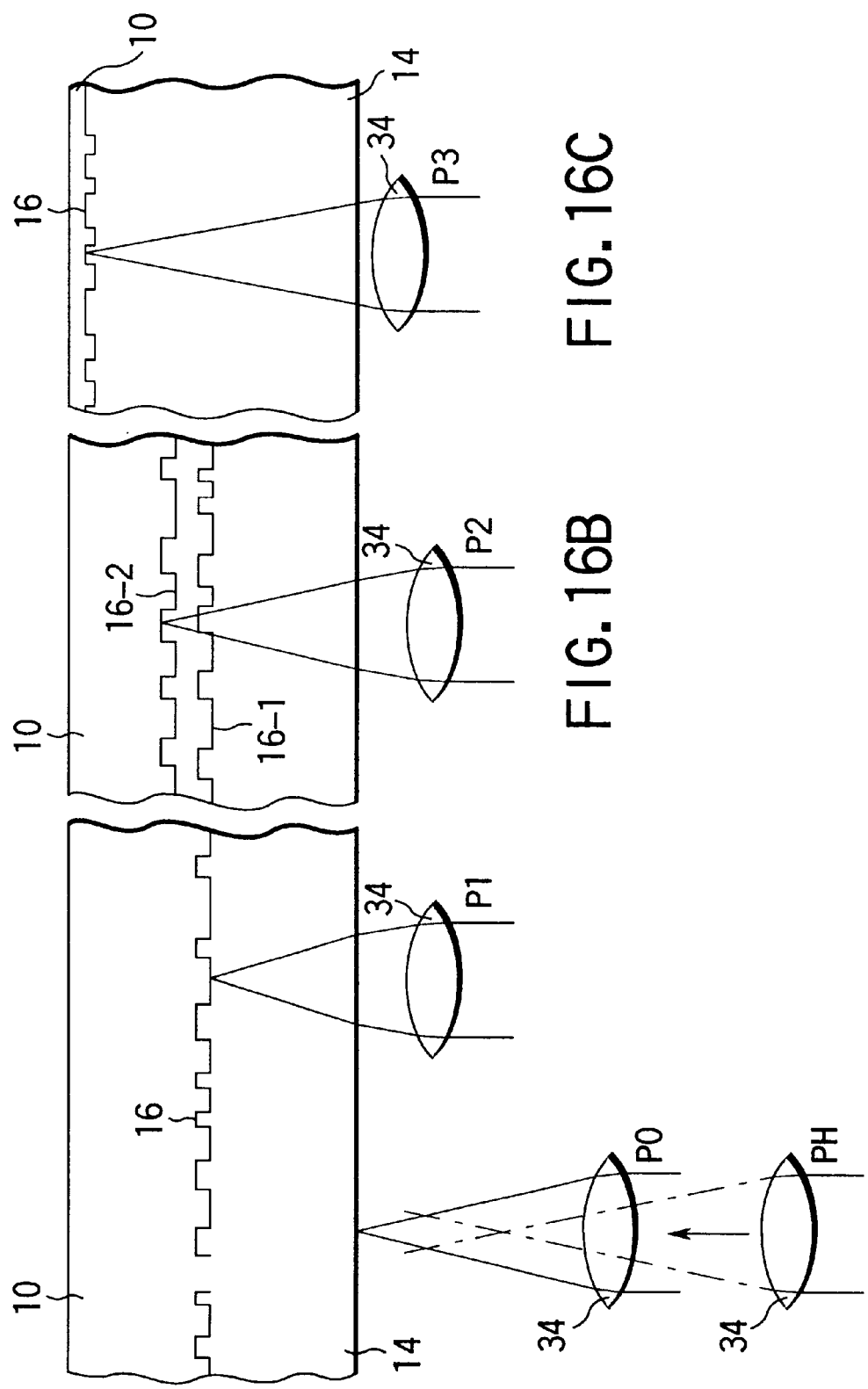
FIGS. 16A, 16B, and 16C are explanatory views showing the states of an objective lens against different types of disks.

An actual circuit operation that takes place along the flow described above will be described with reference to FIG. 15. FIG. 15 shows a schematic block diagram in which the circuit systems are switched in response to a lens initialization signal and a disk discrimination signal. In the circuit shown in FIG. 15, the focus servo group is constituted by a focus error signal generating circuit 102, a focus servo circuit 115, one of the coils 85 and 86, and either one of drive circuits 116 and 118 corresponding to the coils. A tracking servo loop is constituted by a tracking error signal generating circuit 121, a track servo circuit 117, the remaining one of the coils 85 and 86, and either one of the drive circuits 116 and 118 corresponding to the coils. In the circuit shown in FIG. 15, a servo loop switching circuit 120 is arranged between the focus servo circuit 115 and track servo circuit 117, and between the drive circuits 116 and 118. Connection of the circuit 120 is switched in response to a discrimination signal sent from the CPU 50 to form an appropriate servo loop. More specifically, when the coils 85 serve as the focus coils, the servo loop switching circuit 120 is switched by a signal sent from the CPU 50, so that the drive circuit 116 connected to the coils 85 is connected to the focus servo circuit 115 and that the drive circuit 118 connected to the coils 86 is connected to the track servo circuit 117. When the coils 85 serve as the tracking coils, the servo loop switching circuit 120 is similarly switched by a signal sent from the CPU 50, so that the drive circuit 116 connected to the coils 85 is connected to the tracking servo circuit 117 and that the drive circuit 118 connected to the coils 86 is connected to the focus servo circuit 115.

By this lens initialization, the DVD lens 34 is arranged in the optical path. The discriminating operation of the optical disk 10 indicated in step 9 is performed with the DVD lens 34. In the disk discriminating operation, in response to a discriminating operation start command from the CPU 50, the objective lens 34 is moved forward from its home position PH toward the disk 10 at a constant speed, as shown in FIG. 16A. If the objective lens 34 is located at the home position PH, since no beam is substantially reflected by the disk 10, the sum signal SBAD and the peak detection signal are maintained at offset voltage level. As the objective lens 34 moves forward, its focus point is moved forward to coincide with the surface of the transparent substrate 14 of the disk 10. At this time t0, the beam is reflected by the mirror surface of the transparent substrate 14 of the disk 10, and the sum signal SBAD reaches peak level corresponding to mirror surface reflection, as shown in FIGS. 17A to 17E. Since the surface of the transparent substrate 14 of the disk 10 has no pits but is flat, the sum signal SBAD does not have an RF component but has only a DC component. Therefore, the peak detection signal RFRP is kept at offset voltage level. Since the sum signal SBAD is at peak level corresponding to mirror surface reflection and the peak detection signal RFRP is at offset voltage level, the system CPU 50 recognizes that the focus point of the objective lens 34 has reached the surface of the transparent substrate 14 of the optical disk 10 at this time t0. Whether the disk 10 is a DVD or a CD is discriminated from the sum signal SBAD with reference to time t0.

When the objective lens 34 is further moved forward, its focus point enters the transparent substrate 14 but has not reached the reflecting layer 16 yet. The sum signal SBAD and the peak detection signal RFRP are accordingly maintained at offset voltage level. As shown in FIG. 16A, when the focus point of the objective lens 34 coincides with the reflecting layer 16 of the DVD disk 10 and the objective lens 34 is located at an in-focus position $P_1$ of the DVD disk 10, as shown in FIG. 17A, the sum signal SBAD reaches peak level corresponding to the reflectance of the reflecting layer 16. At this time t1, the optical beam is modulated by the pit formed on the reflecting layer 16 and is reflected, and an RF component is mixed in the sum signal SBAD and the peak detection signal RFRP reaches peak level. Since a time interval $T_{DVD}$ between time t0 and time t1 is unique to the DVD disk 10 whose transparent substrate 14 has a thickness of 0.6 mm, the CPU 50 recognizes that the disk 10 searched with the objective lens 34 is a DVD disk. As shown in FIG. 16B, if the DVD disk 10 has two reflecting layers 16-1 and 16-2, as the objective lens 34 moves, the peak detection signal RFRP reaches peak level twice because pits are formed in each of the reflecting layers 16-1 and 16-2. More specifically, as shown in FIG. 17B, two peaks appear in the signal waveform of the peak detection signal RFRP before and after time t1. Accordingly, the CPU 50 recognizes, from the signal waveform of the peak detection signal RFRP having the two peaks, that this DVD disk 10 has two reflecting layers 16.

If no peak appears in the sum signal SBAD at time t1 but does appear at a lapse of a time interval $T_{delta}$ from time t1, as shown in FIG. 17C, the CPU 50 recognizes that the disk 10 searched with the objective lens 34 is a CD disk. More specifically, since the CD disk 10 has a transparent substrate 14 with a thickness of 1.2 mm, the objective lens 34 reaches the in-focus state only after it reaches a position $P_3$. Accordingly, a peak appears in the sum signal SBAD for the first time at time t2, and is detected always with a delay of the time interval $T_{delta}$ from time t1. In a normal CD or CD-R, the peak of the sum signal SBAD is as high as level M, as shown in FIG. 17C, whereas in a CD-E, it is as low as N as shown in FIG. 17D. Concerning the peak level of the peak detection signal RFRP, similarly, it is high in the normal CD or CD-R and low in the CD-E. From these facts, if an intermediate level between level M and level N is stored as a reference value in a ROM 54 in advance, the CPU 50 can make discrimination between a normal CD or CD-R and a CD-E.

When a certain disk 10 is searched with the objective lens 34 and a sum signal SBAD and a peak detection signal RFRP having waveforms as shown in FIG. 17E are obtained, the type of the disk is discriminated in the following manner. A time interval $T_m$ until a peak appears in the sum signal SBAD is discriminated with reference to a time interval $(T_{DVD}+T_{delta})/2$. If $T_m<(T_{DVD}+T_{delta})/2$, the disk 10 is a DVD; if $T_m>(T_{DVD}+T_{delta})/2$, the disk 10 is a CD.

If the disk 10 is a DVD and only one peak appears in the peak detection signal RFRP, this disk 10 is a DVD having one reflecting layer; if two peaks appear in the peak detection signal RFRP, this disk 10 is a DVD having two reflecting layers. When the disk 10 is determined as a CD, if the peak of the sum signal SBAD is higher than level (M+N)/2, this disk 10 is a CD or CD-R; if the peak of the sum signal SBAD is lower than level (M+N)/2, this disk 10 is a CD-E.

In the embodiment described above with reference to FIGS. 3 to 17E, the type of the optical disk 10 is discriminated by utilizing the sum signal SBAD and peak detection signal RFRP. However, the type of the optical disk 10 may be discriminated by referring to a focus error signal, as in another embodiment which will be described with reference to FIGS. 18 to 21. In the above embodiment, the objective lenses 34 and 35 are switched after discrimination of the optical disk 10. However, as disclosed in the second embodiment, the objective lens may be a single lens that can be used for both a DVD and a CD, DVD and CD semiconductor lasers may be prepared, and the light source may be switched in accordance with the discrimination result of an optical disk 10. Furthermore, in the above embodiment, in discrimination of the optical disk 10, the objective lenses 34 and 35 are moved forward toward the optical disk 10. However, to discriminate the optical disk 10 by referring to the focus error signal, it is preferable that the objective lens be moved backward from a position closest to the optical disk 10 to obtain a focus error signal, thereby discriminating the optical disk 10.

Figure 18:
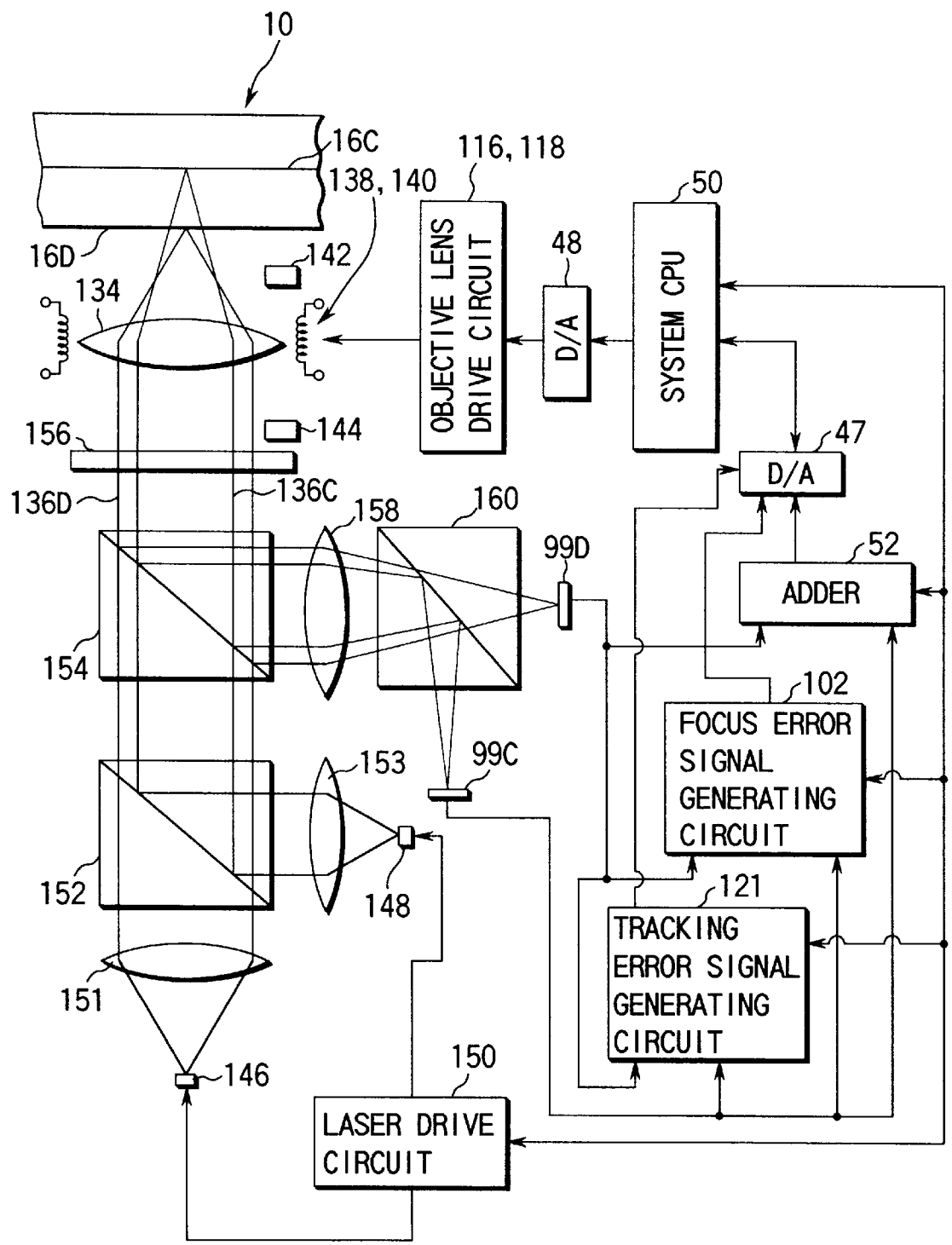
FIG. 18 is a block diagram showing another embodiment of the disk type discrimination device shown in FIG. 1.

FIG. 18 shows a block diagram of an optical system of the second embodiment and its peripheral circuit. Referring to FIG. 18, an optical disk 10 is indicated simply, and both a reflecting surface 16D of a DVD optical disk 10 and a reflecting surface 16C of a CD optical disk 10 are illustrated. Each optical disk 10 has a transparent substrate 14 which is not shown in FIG. 18 for the sake of illustrative convenience. As described above, the transparent substrate 14 of the DVD disk 10 and that of the CD optical disk 10 have different thicknesses. Accordingly, when the DVD optical disk 10 or the CD optical disk 10 is loaded in the apparatus, its recording surface 16D or 16C is arranged as shown in FIG. 18. More specifically, the DVD recording surface 16D is arranged at a position closer to an objective lens 134 than the CD recording surface 16C is.

The objective lens 134 is designed as a single lens that can be utilized for both the DVD and CD, and its lens surface may form a composite lens curved surface for this purpose. When the objective lens 134 is arranged at the focus position, a DCD laser beam 136D is focused on the DVD recording surface 16D, and a CD laser beam 136C is focused on the CD recording surface 16C. The objective lens 134 is suspended by focus coils 138 so that it can be movable along its optical axis. Stoppers 142 and 144 for limiting movement of the objective lens 134 in the direction of optical axis are arranged on the optical disk 10 side and the light source side, respectively. The stoppers 142 and 144 determine a near position at which the objective lens 134 is closest to the optical disk 10 and a remote position at which the objective lens 134 is farthest from the optical disk 10, and the objective lens 134 is moved between the near and remote positions. Similarly as in the embodiment described above, the objective lens 134 is supported such that it can be driven not only by the focus coils 138 but also by tracking coils 140. The focus coils 138 and the tracking coils 140 are respectively driven by objective lens drive circuits 116 and 118, as described above, and the objective lens 134 is moved in the focus direction and tracking direction and is maintained in the focus state and tracking state.

In the optical system shown in FIG. 18, a DVD semiconductor laser 146 for generating the DVD laser beam 136D, e.g., a 650-nm wavelength laser beam, and a CD semiconductor laser 148 for generating the CD laser beam 136C, e.g., a 780-nm wavelength laser beam, are arranged. The DVD and CD semiconductor lasers 146 and 148 are selectively driven by a laser drive circuit 150 in accordance with the type of the optical disk 10. More specifically, when it is determined that the optical disk 10 is a DVD, a type discrimination signal sent from the system CPU 50 switches the laser drive circuit 150 to drive the DVD semiconductor laser 146. The DVD semiconductor laser 146 is driven to generate the DVD laser beam 136D. When it is determined that the optical disk 10 is a CD, a type discrimination signal sent from the system CPU 50 switches the laser drive circuit 150 to drive the CD semiconductor laser 148. The CD semiconductor laser 148 is driven to generate the CD laser beam 136C.

The DVD laser beam 136D becomes incident on a half prism 152 through a collimator lens 151, passes through the half prism 152, and is directed toward the objective lens 134. Similarly, the CD laser beam 136C becomes incident on the half prism 152 through a collimator lens 153, is reflected by the half prism 152, and is directed toward the objective lens 134. Each of the two laser beams 136D and 136C passes through a dichroic prism 154 and a quarter-wave plate 156 to become incident on the objective lens 134, and is focused on a corresponding one of the reflecting surfaces 16C and 16D. The laser beam 136C or 136D reflected by the reflecting surface 16C or 16D passes through the quarter-wave plate 156 again so that its polarization plane is rotated, and is reflected by the dichroic prism 154. The reflected laser beam 136D or 136C is then condensed by a convergent lens 158 and becomes incident on a half prism 160. The DVD laser beam 136D passes through the half prism 160 and is detected by a DVD detector 99D. The CD laser beam 136C is reflected by the half prism 160 and is detected by a CD detector 99C. The DVD detector 99D and the CD detector 99C are selectively set effective to correspond to the semiconductor lasers 146 and 148 that are driven selectively. In accordance with a detection signal sent from either one of the DVD detector 99D and the CD detector 99C, an adder 52 generates a sum signal, a focus error signal generating circuit 102 generates a focus error signal, and a tracking error signal generating circuit 121 generates a tracking error signal. The sum signal, the focus error signal, and the tracking error signal are supplied to the system CPU 50 through a D/A converter 47, and a focus servo operation, a tracking servo operation, and a playback signal processing operation are performed in the same manner as in the embodiment described above.

Figure 17:
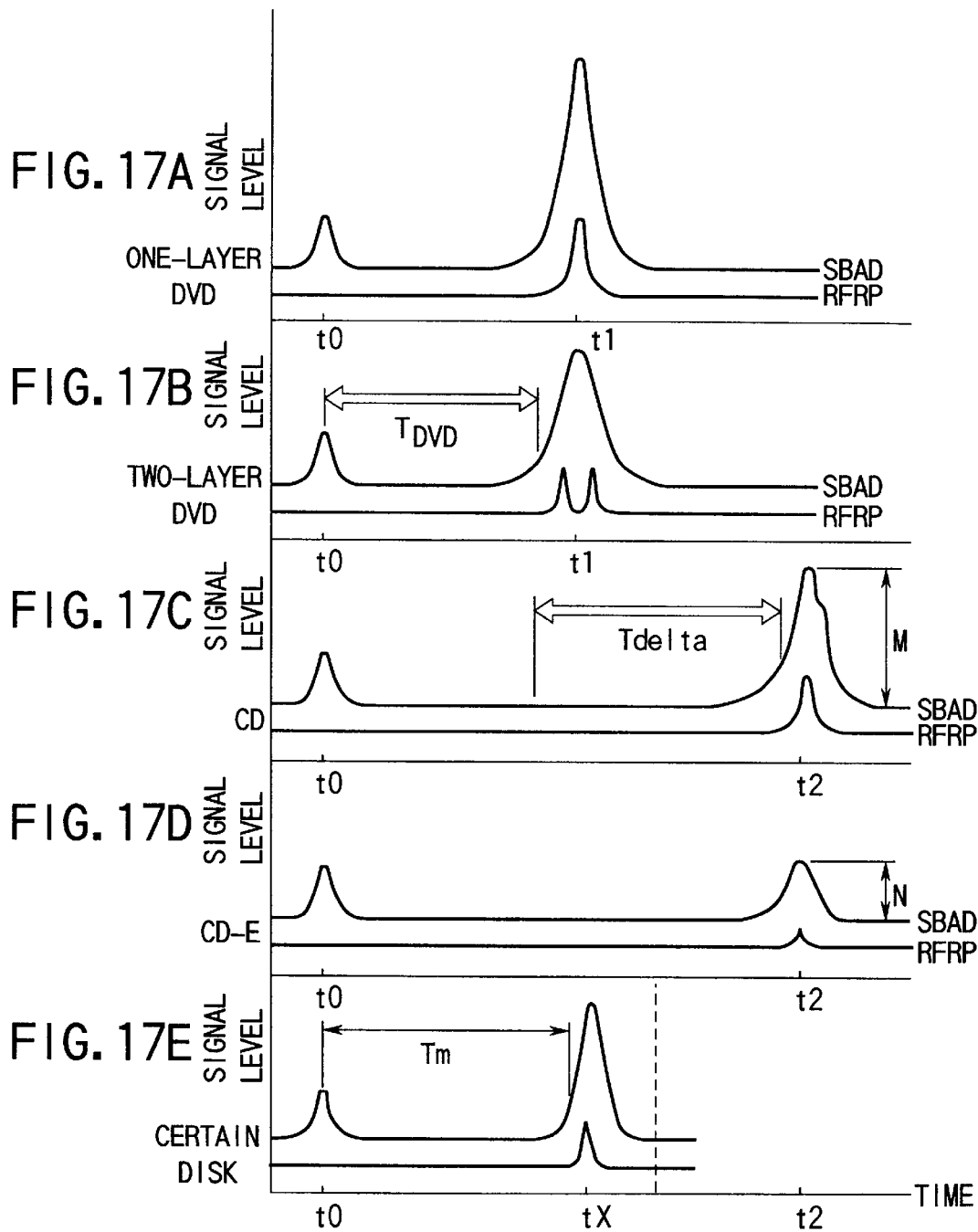
FIGS. 17A to 17E are signal waveform charts for different types of disks in the circuit shown in FIG. 3.

In the optical system shown in FIG. 18, the type of the optical disk 10 may be discriminated by using a sum signal SBAD and a peak detection signal RFRP, as shown in FIG. 17, or may be discriminated from a focus signal, as shown in FIGS. 19A to 19C and FIGS. 20A to 20C.

Figure 19A:
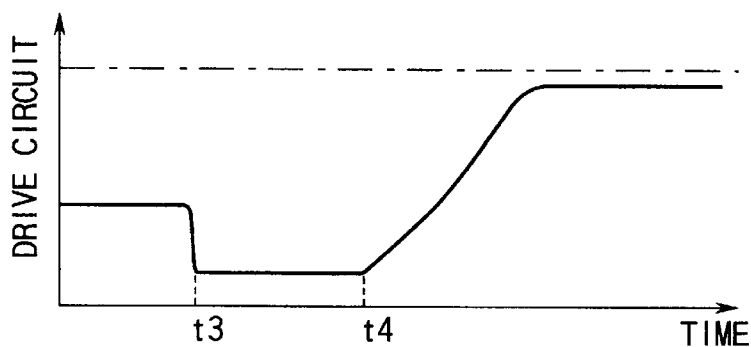
FIGS. 19A to 19C are graphs showing the waveforms of the respective portions in order to explain an example of an optical disk discrimination method in the device shown in FIG. 18.
Figure 19B:
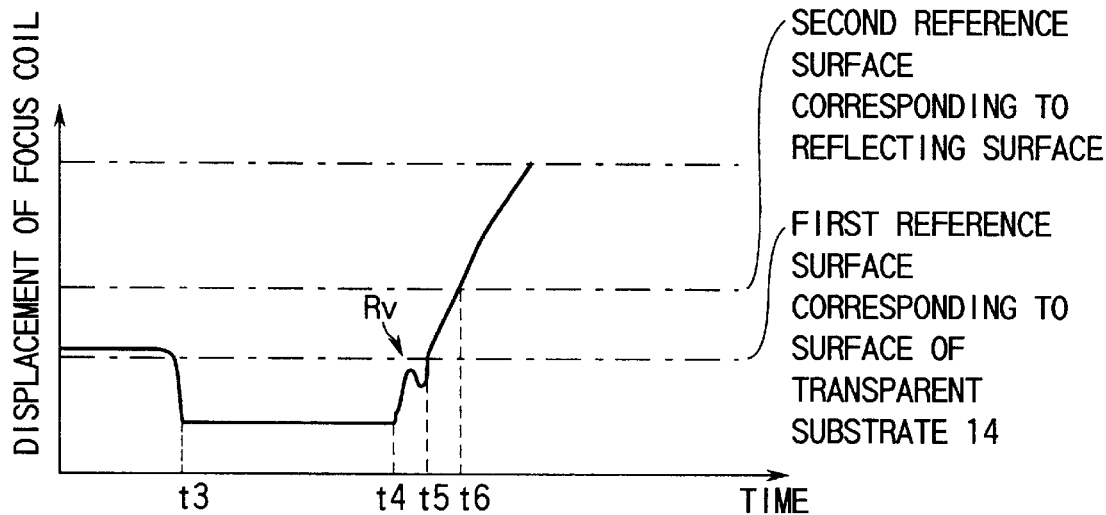
Figure 19C:
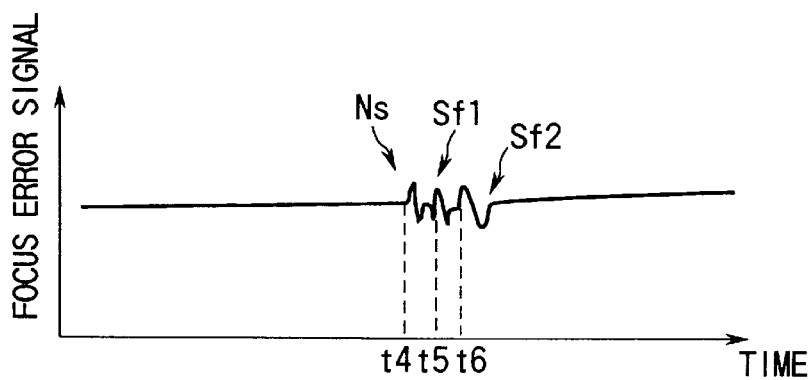
Figure 20A:
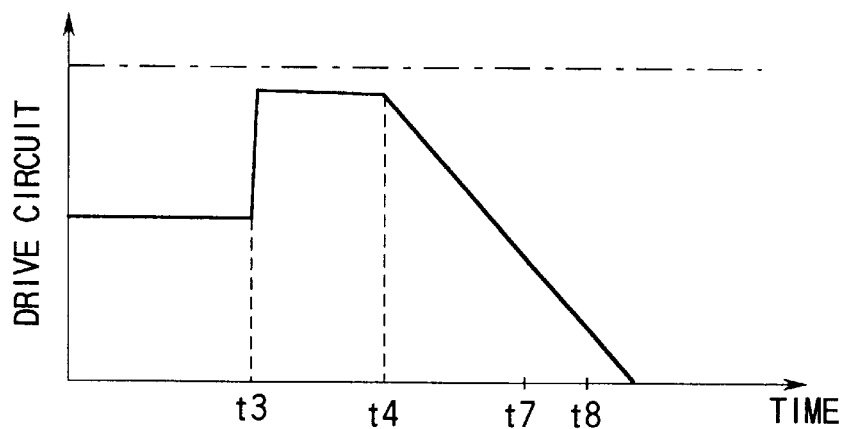
FIGS. 20A to 20C are graphs showing the waveforms of the respective portions in order to explain another example of the optical disk discrimination method in the device shown in FIG. 18.
Figure 20B:
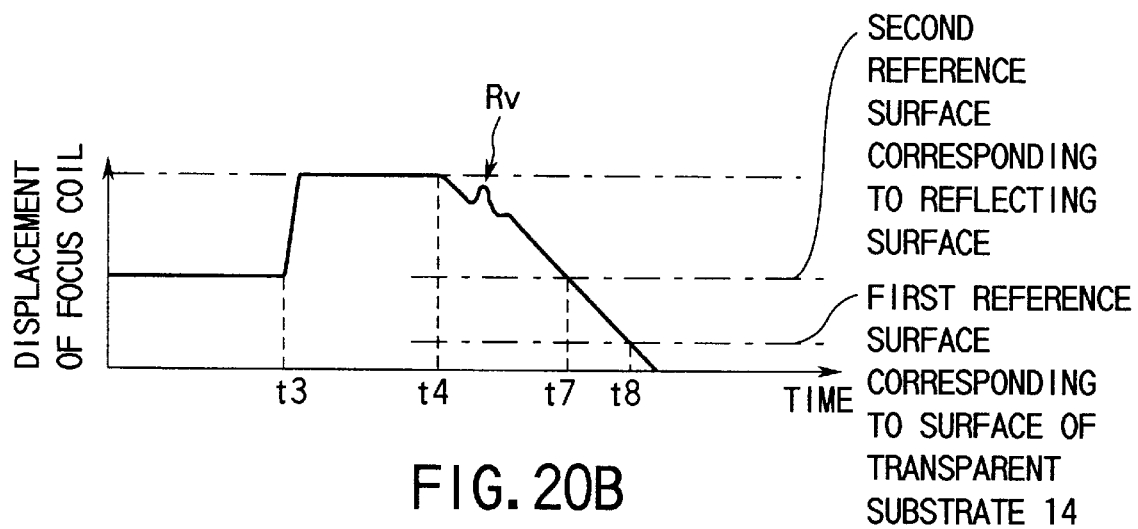
Figure 20C:
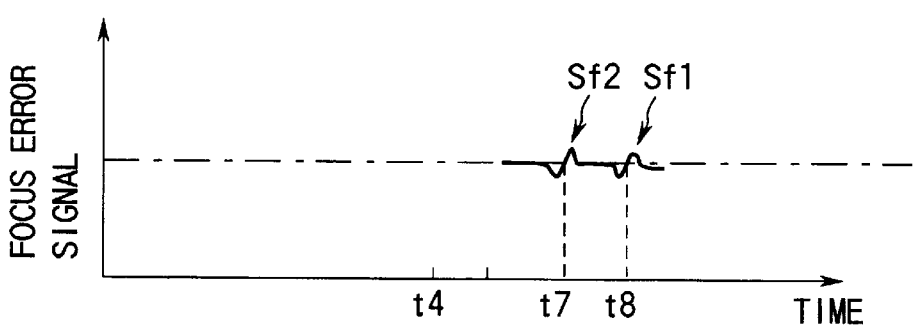

FIGS. 19A to 19C show the signal waveforms of the respective portions that are obtained when the objective lens 134 moves forward from the remote position farthest from the optical disk 10 toward the optical disk 10. FIGS. 20A to 20C show the signal waveforms of the respective portions that are obtained when the objective lens 134 moves backward from the near position closest to the optical disk 10. A method in which the objective lens 134 is moved backward to discriminate the optical disk 10, as shown in FIG. 20A, is more preferable than a method in which the objective lens 134 is moved forward to discriminate the optical disk 10, as shown in FIG. 19A. The method shown in FIGS. 19A to 19C will be described first.

Figure 21:
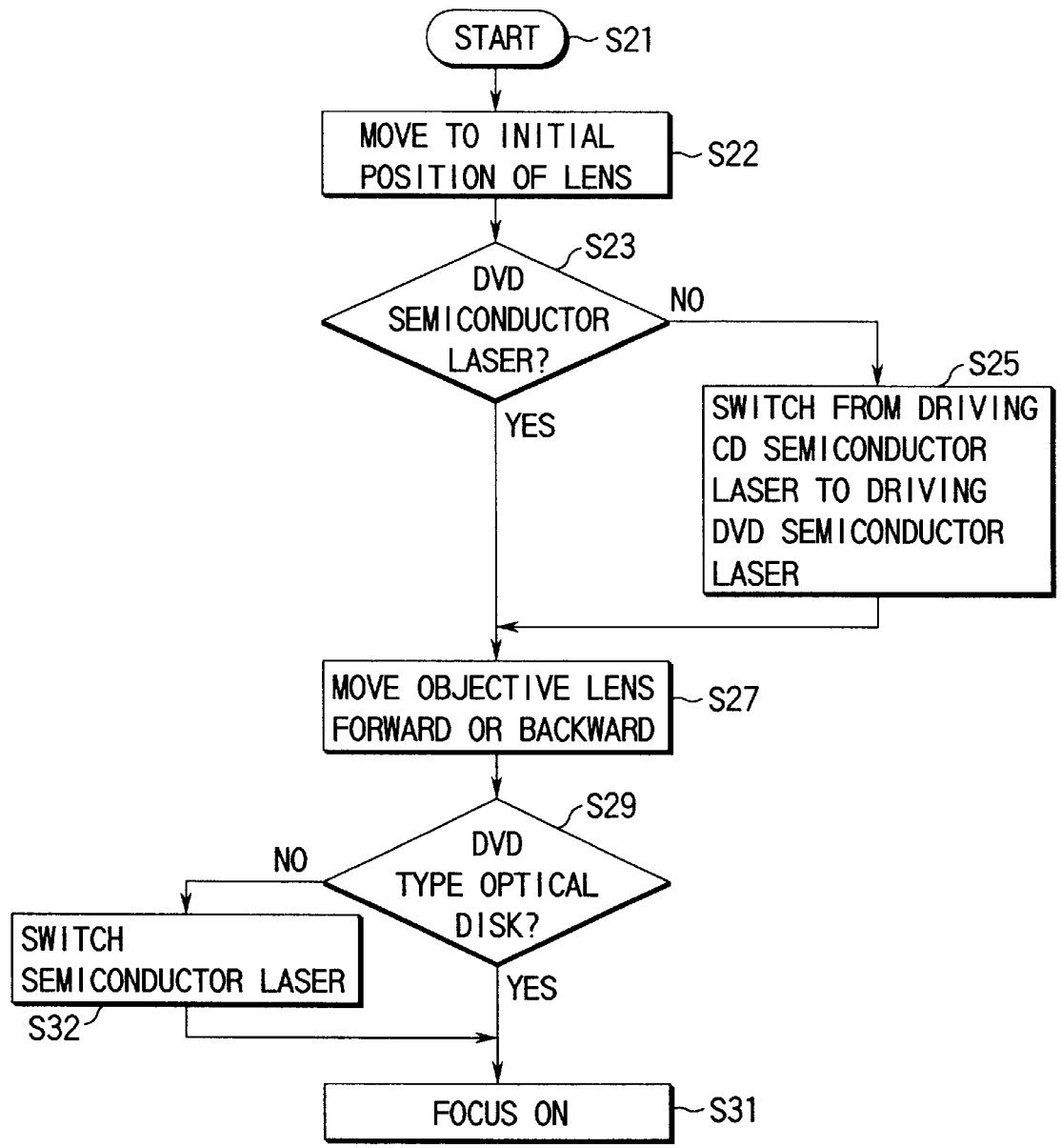
FIG. 21 is a flow chart showing an operation of discriminating the type of an objective lens in the objective lens drive unit shown in FIG. 18 and discriminating the type of the optical disk.

In the method shown in FIGS. 19A to 19C, the power supply of the optical disk apparatus is turned on. Alternatively, the optical disk is mounted on the optical disk apparatus. Thereafter, the flow of FIG. 21 is started from step S21. Since step S21 at the start of the flow until focus-on step S31, the motor drive circuit 11 for driving the spindle motor 12 is maintained inoperative, and the optical disk is maintained not to rotate. This is because the disk discrimination method is not affected to defect the types of the optical disk at high accuracy, due to a vibration or title change of the rotating optical disk. However, if the vibration or title change can be minimized, the optical disk may be rotated. Preferably, the motor drive circuit 11 may lock the spindle motor 12 so the optical disk 10 will not be rotated slightly by an external disturbance. When the operation of discriminating the optical disk 10 shown in FIG. 21 is started at step S21, the drive voltage is decreased in step S22 at time t3, as shown in FIG. 19A, and the objective lens 134 is moved backward to the remote position where it abuts against the stopper 144, i.e., to the initial position. Accordingly, the focus coils 138 are displaced and moved backward to the remote position, and are maintained in this state at time t3. After the focus coils 138 are located at the remote position, whether the DVD semiconductor laser 146 is driven is checked in step S23. If the CD semiconductor laser 148 is driven, it is deenergized, as described in step S25, and the DV semiconductor laser 146 is driven to replace the CD semiconductor laser 148. When the DVD semiconductor laser 146 is driven, the DVD laser beam 136D is radiated toward the reflecting surface 16D or 16C, and the resultant reflected beam is detected by the DVD detector 99D. Until this time, the focus error signal generating circuit 102 is maintained operative, and a detection signal sent from the DVD detector 99D is supplied to the focus error signal generating circuit 102 to enable generation of a focus error signal.

After preparation for discrimination of the type of the optical disk 10 is complete in this manner, forward movement of the objective lens 134 is started at time t4, as indicated in step S27. More specifically, a drive current supplied to the focus coils 138 is increased, as shown in FIG. 19A, and displacement of the focus coils 138 is started. Since the focus coils 138 are started to be driven suddenly from the stopped state, they are temporarily resonated at a resonance frequency f0 unique to the focus coils 138, as indicated by an arrow $R_V$ in FIG. 19B. This resonance continues for a predetermined time interval, e.g., between time t4 and time t5. Along with this resonance, a kind of noise accompanying the resonance appears in the focus error signal, as indicated by an arrow $N_S$ in FIG. 19C.

Along with the forward movement of the objective lens 134, when the focus point of the objective lens 134 coincides with the surface of the transparent substrate 14 of the disk 10 at time t5 in FIG. 19A, it is determined that the objective lens 134 is focused with the surface of the transparent substrate 14, and an S-shaped curve $S_{f1}$ appears in the focus error signal. In FIG. 19B, when the displaced surface of each focus coil corresponds to the surface of the transparent substrate 14, this displaced surface is indicated as the first reference surface. When the objective lens 134 moves further forward, its focus point coincides with either the reflecting surface 16D or 16C. When the focus point of the objective lens 134 coincides with either the reflecting surface 16D or 16C, it is determined that the objective lens 134 is focused on either the reflecting surface 16D or 16C, and an S-shaped curve $S_{f2}$ similarly appears in the focus error signal at time t6 of FIG. 19C. In FIG. 19B, when the displaced surface of each focus coil corresponds to either the reflecting surface 16D or 16C, this displaced surface is indicated as the second reference surface.

As has been described above with reference to FIGS. 17A to 17E, the time interval $T_m$ between time t5 and time t6 corresponds to the time interval $T_{DVD}$ or $(T_{DVD}+T_{delta})$ of FIG. 17B. More specifically, in a disk, e.g., the DVD disk 10, the transparent substrate 14 of which is as thin as 0.6 mm, the time interval $T_m$ between time t5 and time t6 is shorter than a predetermined time interval $(T_{DVD}+T_{delta})/2$, and in a disk, e.g., the CD disk 10, the transparent substrate 14 of which is as comparatively thick as 1.2 mm, the time interval $T_m$ between time t5 and time t6 is sometimes longer than the predetermined time interval $(T_{DVD}+T_{delta})/2$. According to this principle, whether the optical disk 10 is of the high-density recording (DVD) type or general-recording density CD type is checked in step S29. In step S29, if it is confirmed that the optical disk 10 is of the high-density recording (DVD) type, it is determined that the DVD semiconductor laser 146 corresponding to this DVD type is driven, and the focus operation is started as described in step S31. In contrast to this, in step S29, if it is confirmed that the optical disk 10 is of the CD type, a switching signal is supplied from the system CPU 50 to the laser drive circuit 150, as indicated in step S32. The DVD semiconductor laser 146 is deenergized and the CD semiconductor laser 148 is driven, and the CD laser beam 136C is generated toward the optical system. Thereafter, the focus operation corresponding to the CD type optical disk 10 is started, as indicated in step S31. Prior to step S31 at which the focus operation is started, the spindle motor drive circuit 11 is energized, as described above, to start driving the spindle motor 12, so that rotation of the disk 10 is started. The focus operation in step S31 is performed while the optical disk 10 is rotated.

The flow described above is made on the supposition that the DVD semiconductor laser 146 is basically driven during initialization. However, another flow is apparently possible in which the CD semiconductor laser 148 is driven during initialization.

In the discrimination method shown in FIGS. 19A to 19C, the noise $N_S$ appears in the focus error signal, and sometimes this noise $N_S$ and the S-shaped curve $S_{f1}$ are mixed in the focus error signal. In particular, when the objective lens 134 is moved backward to be located at the backward position where it abuts against the stopper 144, if the position of the focus point of the objective lens 134 and the surface of the substrate of the disk 10 are close to each other, or if attenuation of resonance takes time, the noise $N_S$ and the S-shaped curve $S_{f1}$ are very likely to be mixed in the focus error signal. Considering this, as shown in FIG. 20A, preferably, the objective lens 134 is moved forward, until abutting against the stopper 142, to be arranged at the near position and is moved backward, and then the discriminating operation is started. This discriminating operation will be described with reference to FIGS. 20A to 20C.

In the discrimination method shown in FIGS. 20A to 20C, when the operation of discriminating the optical disk 10 shown in FIG. 21 is started at step S21, the drive voltage is increased in step S22 at time t3, as shown in FIG. 20A, and the objective lens 134 is moved forward to the near position where it abuts against the stopper 142, i.e., to the initial position. Accordingly, the focus coils 138 are displaced and moved forward to the near position, and are maintained in this state at time t3. After the focus coils 138 are located at the near position, whether the DVD semiconductor laser 146 is driven is checked in step S23. If the CD semiconductor laser 148 is driven, it is deenergized in step S25, as described above, and the DVD semiconductor laser 146 is driven to replace the CD semiconductor laser 148. When the DVD semiconductor laser 146 is driven, the DVD laser beam 136D is irradiated toward the reflecting surface 16D or 16C, and the resultant reflected beam is detected by the DVD detector 99D.

After preparation for discrimination of the type of the optical disk 10 is complete in this manner, backward movement of the objective lens 134 is started at time t4, as described in step S27. More specifically, a drive current supplied to the focus coils 138 is decreased, as shown in FIG. 20A, and displacement of the focus coils 138 is started. Since the focus coils 138 are started to be driven suddenly from the stopped state, they are temporarily resonated at a resonance frequency f0 unique to the focus coils 138, as indicated by an arrow $R_V$ in FIG. 20B. This resonance continues for predetermined time interval, e.g., from time t4 for a certain attenuation time. This attenuation disappears until the objective lens 134 is focused with either the reflecting surface 16D or 16C and the S-shaped curve $S_{f2}$ appears. After the lapse of this attenuation time, the focus error signal generating circuit 102 is switched to the operative state, and a detection signal from the DVD detector 99D is supplied to the focus error signal generating circuit 102 to enable generation of a focus error signal. In this manner, since the focus error signal generating circuit 102 is made effective after the lapse of the attenuation time, noise $N_S$ accompanying this resonance does not appear in the focus error signal, as shown in FIG. 20C.

Along with the backward movement of the objective lens 134, the focus point of the objective lens 134 is set to coincide with either the reflecting surface 16D or 16C at time t7 in FIG. 20A. When the focus point of the objective lens 134 coincides with either the reflecting surface 16D or 16C, it is determined that the objective lens 134 is focused with either the reflecting surface 16D or 16C, and an S-shaped curve $S_{f2}$ appears in the focus error signal at time t6 in FIG. 20C. Thereafter, when the objective lens 134 is further moved backward, its focus point coincides with the surface of the transparent substrate 14 of the disk 10. When the focus point of the objective lens 134 coincides with the surface of the transparent substrate 14 of the disk 10, it is determined that the objective lens 134 is focused with the surface of the transparent substrate 14, and an S-shaped curve $S_{f1}$ appears in the focus error signal.

As has been described above with reference to FIGS. 17A to 17E, a time interval $T_m$ between time t7 and time t8 corresponds to the time interval $T_{DVD}$ or $(T_{DVD}+T_{delta})$ of FIG. 17B. More specifically, in a disk, e.g., the DVD disk 10, the transparent substrate 14 of which is as thin as 0.6 mm, the time interval $T_m$ between time t7 and time t8 is shorter than a predetermined time interval $(T_{DVD}+T_{delta})/2$, and in a disk, e.g., the CD disk 10, the transparent substrate 14 of which is as comparatively thick as 1.2 mm, the time interval $T_m$ between time t5 and time t6 is sometimes longer than the predetermined time interval $(T_{DVD}+T_{delta})/2$. According to this principle, whether the optical disk 10 is of the high-density recording (DVD) type or general recording-density CD type is checked in step S29. In step S29, if it is confirmed that the optical disk 10 is of the high-density recording (DVD) type, it is determined that the DVD semiconductor laser 146 corresponding to this DVD type is driven, and the focus operation is started as indicated in step S31. In contrast to this, in step S29, if it is confirmed that the optical disk 10 is of the CD type, a switching signal is supplied from the system CPU 50 to the laser drive circuit 150, as indicated in step S32. The DVD semiconductor laser 146 is deenergized and the CD semiconductor laser 148 is driven, and the CD laser beam 136C is generated toward the optical system. Thereafter, the focus operation corresponding to the CD type optical disk 10 is started, as indicated in step S31. Prior to step S31 at which the focus operation is started, the spindle motor drive circuit 11 is energized, as described above, to start driving the spindle motor 12, so that rotation of the disk 10 is started. The focus operation in step S31 is performed while the optical disk 10 is rotated.

As described above, when the method of moving the objective lens 134 backward rather than forward is employed, the risk of causing an S-shaped curve to appear in a focus signal within an attenuation time, within which resonance of the objective lens 134 settles down, becomes smaller, and disk discrimination can be performed reliably.

In the disk type discrimination device described above, the objective lens is moved along its optical axis to search a disk, and the type of the disk is discriminated from the waveform of the signal detected during search. Accordingly, the type of the disk can always be discriminated within a certain period of time, giving the user the sense of security.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An optical disk apparatus comprising:
    a head unit having converging means through which an optical beam corresponding to one of a plurality of different numerical apertures (NAs) is output in accordance with a thickness of an optical disk, said optical disk including a reflecting layer and a transparent substrate formed on the reflecting layer;
    moving means for moving the converging means along an optical axis of the converging means as the optical beam corresponding to the greatest numerical aperture (NA) is being output; and
    discriminating means for discriminating a type of the optical disk in response to detection of the optical beam corresponding to the greatest numerical aperture reflected by a surface of the transparent substrate of the optical disk and by the reflecting layer of the optical disk, said optical beam being detected as the converging means is being moved by the moving means.

2. A device according to claim 1, wherein said discriminating means comprises
    means for detecting the reflected optical beam and generating a detection signal corresponding to a light intensity of the reflected optical beam, and
    detection means for detecting an RF component included in the detection signal and generating an RF detection signal.

3. A device according to claim 2, wherein said discriminating means includes third discriminating means for discriminating the number of reflecting layers from the number of peaks included in the detection signal.

4. A device according to claim 2, wherein said discriminating means includes fourth discriminating means for discriminating the type of the optical disk based on characteristics of the reflecting layer present in peaks included in the RF detection signal.

5. A device according to claim 1, wherein said discriminating means includes second discriminating means for discriminating the type of the optical disk based on a thickness of the transparent substrate measured from a time interval between two peaks included in a detection signal generated by the discriminating means.

6. A device according to claim 1, wherein said discriminating means comprises
    means for detecting the reflected optical beam and generating a detection signal corresponding to a light intensity of the reflected optical beam, and
    focus error generating means for generating, from the detection signal, first and second focus error signals corresponding to a focus state of said focusing means.

7. A device according to claim 6, wherein said moving means moves said focusing means backward from a position close to the disk, and generates the first and second focus error signals in response to the optical beam reflected by the reflecting layer of the disk and by a surface of the reflecting layer.

8. A device according to claim 6, wherein said discriminating means discriminates the type of the disk from a time interval between the first and second focus error signals.

9. A device according to claim 6, further comprising rotating means for rotating the disk, and control means for controlling said rotating means, said control means deenergizing said rotating means to stop rotation of the disk while said discriminating means discriminates the type of the disk and, after said discriminating means discriminates the type of the disk, energizing said rotating means to rotate the disk.

10. A discrimination method for use in an optical disk apparatus, wherein a head unit having converging means is utilized, and an optical beam corresponding to one of a plurality of different numerical apertures (NAs) is output in accordance with a thickness of an optical disk, each of said disks including a reflecting layer and a transparent substrate formed on the reflecting layer, said method comprising:

moving the converging means along an optical axis of the converging means as the optical beam corresponding to the greatest numerical aperture (NA) is being output; and discriminating a type of the optical disk in response to detection of the optical beam corresponding to the greatest numerical aperture reflected by a surface of the transparent substrate of the optical disk and by the reflecting layer of the optical disk, said optical beam being detected as the converging means is being moved.

11. A method according to claim 10, wherein the discrimination of the type of the optical disk comprises detecting the reflected optical beam and generating a detection signal corresponding to a light intensity of the reflected beam, and detecting an RF component included in the detection signal and generating an RF detection signal.

12. A method according to claim 10, wherein the discriminating of the type of optical disk includes a second discrimination of the type of the optical disk based on a thickness of the transparent substrate measured from a time interval between two peaks included in a detection signal.

13. A method according to claim 12, wherein the discrimination of the type of optical disk includes a third discrimination of the number of reflecting layers from the number of peaks included in the detection signal.

14. A method according to claim 12, wherein the discrimination of the type of optical disk includes a fourth discrimination of the type of the optical disk based on characteristics of the reflecting layer present in peaks included in the detection signal.

15. A method according to claim 10, wherein the discrimination of the type of optical disk comprises detecting the reflected beam and generating a detection signal corresponding to a light intensity of the reflected beam, and generating, from the detection signal, first and second focus error signals corresponding to a focus state in the focusing step.

16. A method according to claim 15, wherein the moving of the converging means includes moving said focusing means backward from a position close to the disk, and the generation of the focus error signals includes generating the first and second focus error signals in response to the optical beam reflected by the reflecting layer of the disk and by a surface of the reflecting layer.

17. A method according to claim 15, wherein the discriminating of the disk type comprises discriminating the type of the disk from a time interval between the first and second focus error signals.

18. A method according to claim 10, wherein rotation of the disk is stopped during discrimination while the type of the disk is discriminated, and after the type of the disk is discriminated, the disk is rotated.

* * * * *